(12) United States Patent
Raman et al.

(10) Patent No.: US 8,826,443 B1
(45) Date of Patent: Sep. 2, 2014

(54) SELECTIVE REMOVAL OF PROTECTED CONTENT FROM WEB REQUESTS SENT TO AN INTERACTIVE WEBSITE

(75) Inventors: Shree Raman, Pune (IN); John Gerald Ferguson, San Francisco, CA (US); Bruce Christopher Wootton, Alameda, CA (US); Timothy Micheal Wyatt, San Francisco, CA (US); Hai Chen, Belmont, CA (US)

(73) Assignee: Symantec Corporation, Mountain View, CA (US)

( * ) Notice: Subject to any disclaimer, the term of this patent is extended or adjusted under 35 U.S.C. 154(b) by 939 days.

(21) Appl. No.: 12/395,554

(22) Filed: Feb. 27, 2009

Related U.S. Application Data

(60) Provisional application No. 61/098,207, filed on Sep. 18, 2008.

(51) Int. Cl.
*G06F 21/10* (2013.01)
*G06F 21/62* (2013.01)
*G06F 21/60* (2013.01)

(52) U.S. Cl.
CPC ........ *G06F 21/6245* (2013.01); *G06F 21/6254* (2013.01); *G06F 21/60* (2013.01)
USPC .......................................................... 726/26

(58) Field of Classification Search
CPC .. G06F 21/60; G06F 21/6245; G06F 21/6254
USPC .......................................................... 726/26
See application file for complete search history.

(56) References Cited

U.S. PATENT DOCUMENTS

| 4,858,152 A | 8/1989 | Estes |
| 5,212,821 A | 5/1993 | Gorin et al. |

(Continued)

FOREIGN PATENT DOCUMENTS

| CA | 2 499 508 | 4/2004 |
| CA | 2 597 083 | 8/2006 |

(Continued)

OTHER PUBLICATIONS (copyright 2006 by vnikic), Web-Harvest Overview, Nov. 2006, Retrieved from the Internet <URL: web.archive.org/web/20061130081756/http://web-harvest.sourceforge.net/overview.php>, pp. 1-15 as printed.*

(Continued)

*Primary Examiner* — Michael Chao
(74) *Attorney, Agent, or Firm* — Lowenstein Sandler LLP

(57) ABSTRACT

A method and apparatus for selectively removing a data element that triggers a policy violation from a web request to an interactive website. In one embodiment, a computer-implemented method identifies a policy for protecting source data, having a plurality of data elements. The method further evaluates a web request sent to an interactive website as part of a web-based application, and determines that the web request includes at least one of the plurality of data elements triggering a violation of the policy. The method determines the data boundaries of the web request, and selectively removes data content within the data boundaries containing the at least one data element that triggered the violation to allow the web request to be processed by the interactive website as if it were the original web request containing the at least one data element.

19 Claims, 10 Drawing Sheets

(56) References Cited

U.S. PATENT DOCUMENTS

| | | |
|---|---|---|
| 5,379,391 A | 1/1995 | Belsan et al. |
| 5,384,892 A | 1/1995 | Strong |
| 5,577,249 A | 11/1996 | Califano |
| 5,796,948 A | 8/1998 | Cohen |
| 5,832,212 A | 11/1998 | Cragun et al. |
| 5,835,722 A | 11/1998 | Bradshaw et al. |
| 5,883,588 A | 3/1999 | Okamura |
| 5,884,033 A | 3/1999 | Duvall et al. |
| 5,889,958 A | 3/1999 | Willens |
| 5,892,905 A | 4/1999 | Brandt et al. |
| 5,958,015 A | 9/1999 | Dascalu |
| 5,960,080 A | 9/1999 | Fahlman et al. |
| 5,996,011 A | 11/1999 | Humes |
| 6,004,276 A | 12/1999 | Wright et al. |
| 6,029,144 A | 2/2000 | Barrett et al. |
| 6,047,283 A | 4/2000 | Braun |
| 6,055,538 A | 4/2000 | Kessenich et al. |
| 6,065,056 A | 5/2000 | Bradshaw et al. |
| 6,073,142 A | 6/2000 | Geiger et al. |
| 6,094,689 A | 7/2000 | Embry et al. |
| 6,125,371 A | 9/2000 | Bohannon et al. |
| 6,138,168 A | 10/2000 | Kelly et al. |
| 6,233,618 B1 | 5/2001 | Shannon |
| 6,256,631 B1 | 7/2001 | Malcolm |
| 6,266,775 B1 | 7/2001 | Kamba |
| 6,289,375 B1 | 9/2001 | Knight et al. |
| 6,289,462 B1 | 9/2001 | McNabb et al. |
| 6,314,190 B1 | 11/2001 | Zimmermann |
| 6,321,224 B1 | 11/2001 | Beall et al. |
| 6,347,087 B1 | 2/2002 | Ganesh et al. |
| 6,347,374 B1 | 2/2002 | Drake et al. |
| 6,347,376 B1 | 2/2002 | Attwood et al. |
| 6,360,215 B1 | 3/2002 | Judd et al. |
| 6,374,241 B1 | 4/2002 | Lamburt |
| 6,396,513 B1 | 5/2002 | Helfman et al. |
| 6,442,607 B1 | 8/2002 | Korn et al. |
| 6,442,686 B1 | 8/2002 | McArdle et al. |
| 6,453,338 B1 | 9/2002 | Shiono |
| 6,507,846 B1 | 1/2003 | Consens |
| 6,539,430 B1 | 3/2003 | Humes |
| 6,604,141 B1 | 8/2003 | Ventura |
| 6,618,725 B1 | 9/2003 | Fukuda et al. |
| 6,636,838 B1 | 10/2003 | Perlman et al. |
| 6,639,615 B1 | 10/2003 | Majumdar |
| 6,701,314 B1 | 3/2004 | Conover et al. |
| 6,711,579 B2 | 3/2004 | Balakrishnan |
| 6,714,936 B1 | 3/2004 | Nevin, III |
| 6,732,087 B1 | 5/2004 | Hughes et al. |
| 6,738,908 B1 | 5/2004 | Bonn et al. |
| 6,754,832 B1 | 6/2004 | Godwin et al. |
| 6,768,986 B2 | 7/2004 | Cras et al. |
| 6,769,032 B1 | 7/2004 | Katiyar et al. |
| 6,778,979 B2 | 8/2004 | Grefenstette et al. |
| 6,779,120 B1 * | 8/2004 | Valente et al. ............. 726/1 |
| 6,829,613 B1 | 12/2004 | Liddy |
| 6,829,635 B1 | 12/2004 | Townshend |
| 6,834,286 B2 | 12/2004 | Srinivasan |
| 6,871,284 B2 | 3/2005 | Cooper et al. |
| 6,941,466 B2 | 9/2005 | Mastrianni et al. |
| 6,947,985 B2 | 9/2005 | Hegli et al. |
| 6,965,886 B2 | 11/2005 | Govrin et al. |
| 6,983,186 B2 | 1/2006 | Navani et al. |
| 6,996,788 B2 | 2/2006 | Akiba et al. |
| 7,000,154 B1 | 2/2006 | LeDuc |
| 7,003,562 B2 | 2/2006 | Mayer |
| 7,010,572 B1 | 3/2006 | Benjamin et al. |
| 7,114,185 B2 | 9/2006 | Moore et al. |
| 7,130,885 B2 | 10/2006 | Chandra et al. |
| 7,146,402 B2 | 12/2006 | Kucherawy |
| 7,162,738 B2 | 1/2007 | Dickinson, III et al. |
| 7,191,252 B2 | 3/2007 | Redlich et al. |
| 7,203,749 B2 | 4/2007 | Hiraga et al. |
| 7,222,158 B2 | 5/2007 | Wexelblat |
| 7,237,008 B1 | 6/2007 | Tarbotton et al. |
| 7,237,267 B2 | 6/2007 | Rayes et al. |
| 7,249,175 B1 | 7/2007 | Donaldson |
| 7,320,004 B1 | 1/2008 | DeLuca et al. |
| 7,437,304 B2 | 10/2008 | Barnard et al. |
| 7,447,718 B2 | 11/2008 | Orumchian |
| 7,464,402 B2 | 12/2008 | Briscoe et al. |
| 7,472,114 B1 | 12/2008 | Rowney et al. |
| 7,516,492 B1 | 4/2009 | Nisbet et al. |
| 7,523,498 B2 | 4/2009 | Fellenstein et al. |
| 7,685,626 B2 | 3/2010 | Malcolm |
| 7,716,217 B2 | 5/2010 | Marston et al. |
| 7,716,240 B2 | 5/2010 | Lim |
| 7,725,732 B1 | 5/2010 | Ballard |
| 7,756,843 B1 | 7/2010 | Palmer |
| 7,774,363 B2 | 8/2010 | Lim |
| 7,788,235 B1 | 8/2010 | Yeo |
| 7,877,409 B2 | 1/2011 | Lim |
| 7,882,560 B2 | 2/2011 | Kraemer |
| 7,886,359 B2 | 2/2011 | Jones et al. |
| 7,996,373 B1 | 8/2011 | Zoppas |
| 7,996,374 B1 | 8/2011 | Jones et al. |
| 7,996,385 B2 | 8/2011 | Rowney |
| 8,011,003 B2 | 8/2011 | Rowney et al. |
| 8,024,431 B2 | 9/2011 | Hoffman |
| 8,041,719 B2 | 10/2011 | Rowney |
| 8,051,187 B2 | 11/2011 | Noy |
| 8,065,739 B1 | 11/2011 | Bruening |
| 8,131,745 B1 | 3/2012 | Hoffman |
| 8,225,371 B2 | 7/2012 | Jones et al. |
| 8,255,370 B1 | 8/2012 | Zoppas |
| 8,312,553 B2 | 11/2012 | Rowney |
| 8,566,305 B2 | 10/2013 | Rowney |
| 8,595,849 B2 | 11/2013 | Jones |
| 2001/0027451 A1 | 10/2001 | Taguchi et al. |
| 2001/0037324 A1 | 11/2001 | Agrawal et al. |
| 2002/0010679 A1 | 1/2002 | Felsher |
| 2002/0073313 A1 | 6/2002 | Brown et al. |
| 2002/0093676 A1 | 7/2002 | Parry |
| 2002/0120586 A1 * | 8/2002 | Masaki et al. .................. 705/75 |
| 2002/0129140 A1 | 9/2002 | Peled et al. |
| 2002/0138579 A1 | 9/2002 | Goldberg |
| 2002/0178228 A1 | 11/2002 | Goldberg |
| 2002/0198766 A1 | 12/2002 | Magrino et al. |
| 2002/0199095 A1 | 12/2002 | Bandini et al. |
| 2003/0051026 A1 | 3/2003 | Carter et al. |
| 2003/0093518 A1 | 5/2003 | Hiraga |
| 2003/0167402 A1 | 9/2003 | Stolfo et al. |
| 2004/0039991 A1 | 2/2004 | Hopkins et al. |
| 2004/0088425 A1 * | 5/2004 | Rubinstein et al. ........... 709/230 |
| 2004/0185885 A1 | 9/2004 | Kock |
| 2004/0187024 A1 | 9/2004 | Briscoe et al. |
| 2004/0193910 A1 | 9/2004 | Moles |
| 2004/0225645 A1 | 11/2004 | Rowney et al. |
| 2005/0027723 A1 | 2/2005 | Jones et al. |
| 2005/0039033 A1 | 2/2005 | Meyers et al. |
| 2005/0060537 A1 | 3/2005 | Stamos et al. |
| 2005/0081121 A1 | 4/2005 | Wedel |
| 2005/0086252 A1 | 4/2005 | Jones et al. |
| 2005/0096048 A1 | 5/2005 | Clare |
| 2005/0132206 A1 * | 6/2005 | Palliyil et al. ................. 713/188 |
| 2005/0138110 A1 | 6/2005 | Redlich et al. |
| 2005/0182765 A1 | 8/2005 | Liddy |
| 2005/0193004 A1 | 9/2005 | Cafeo et al. |
| 2005/0216771 A1 | 9/2005 | Malcolm |
| 2005/0257267 A1 | 11/2005 | Williams et al. |
| 2006/0005247 A1 | 1/2006 | Zhang et al. |
| 2006/0143459 A1 * | 6/2006 | Villaron et al. ............... 713/176 |
| 2006/0184549 A1 | 8/2006 | Rowney et al. |
| 2006/0224426 A1 | 10/2006 | Goossens |
| 2006/0224589 A1 | 10/2006 | Rowney et al. |
| 2006/0253597 A1 | 11/2006 | Mujica |
| 2007/0011158 A1 | 1/2007 | Parikh |
| 2007/0130255 A1 | 6/2007 | Wolovitz et al. |
| 2007/0136237 A1 * | 6/2007 | Barker et al. .................... 707/2 |
| 2007/0136788 A1 | 6/2007 | Monahan et al. |
| 2007/0156897 A1 | 7/2007 | Lim |
| 2007/0169182 A1 | 7/2007 | Wolfond et al. |
| 2007/0261099 A1 | 11/2007 | Broussard |
| 2007/0300306 A1 * | 12/2007 | Hussain .......................... 726/27 |
| 2008/0066150 A1 | 3/2008 | Lim et al. |

(56) References Cited

U.S. PATENT DOCUMENTS

| | | | |
|---|---|---|---|
| 2008/0148357 | A1 | 6/2008 | Chen et al. |
| 2008/0168135 | A1* | 7/2008 | Redlich et al. ............... 709/204 |
| 2008/0235760 | A1 | 9/2008 | Broussard |
| 2008/0263626 | A1 | 10/2008 | Bainter et al. |
| 2009/0013399 | A1* | 1/2009 | Cottrell et al. ................. 726/12 |
| 2009/0037594 | A1 | 2/2009 | Sever et al. |
| 2009/0048997 | A1* | 2/2009 | Manickam et al. ............ 706/47 |
| 2010/0031312 | A1 | 2/2010 | Dixit |
| 2010/0169970 | A1 | 7/2010 | Stolfo et al. |
| 2010/0251363 | A1 | 9/2010 | Todorovic |
| 2010/0332481 | A1 | 12/2010 | Rowney |

FOREIGN PATENT DOCUMENTS

| | | |
|---|---|---|
| GB | 2 343 030 A | 4/2000 |
| GB | 2466367 A | 6/2010 |
| JP | 2002-189643 | 5/2002 |
| JP | 2006-539334 | 12/2005 |
| JP | 2008-171101 | 7/2008 |
| JP | 2008-537195 | 9/2008 |
| WO | WO2004/027653 | 4/2004 |
| WO | WO2006/088952 | 8/2006 |

OTHER PUBLICATIONS

Manes et al., A Framework for Redacting Digital Information from Electronic Devices, 2007, Retrieved from the Internet <URL: ieeexplore.ieee.org/stamp/stamp.jsp?arnumber=04267542 >, pp. 1-5 as printed.*
Alonso, Omar, et al, Oracle Secure Enterprise Search 10g, An Oracle Technical White Paper, Mar. 2006, 21 pages.
Attenex, Attenex Patterns Suite, http://www.attenex.com/products_servies/attenex_patterns_suite.aspx, Downloaded Feb. 20, 2008, 2 pages.
Autonomy, Autonomy Group product overview, http://www.autonomy.com/content/products/index.en.html, Downloaded Feb. 20, 2008, 2 pages.
Autonomy, Security, http://www.autonomy.com/content/Technology/Technology_Benefits/security, Feb. 20, 2008, 2 pages.
Autonomy, Technology overview, http://www.autonomy.com/content/Technmology/index.en.html, Downloaded Feb. 20, 2008, 2 pp.
Autonomy, Limitations of Other Approaches, http://www.autonomy.com/content/Technmology/Limitations_Other _Approaches, Downloaded Feb. 20, 2008, 2 pages.
Buchta, Stefan, Oracle Secure Enterprise Search Version 10.1.8.2, An Oracle Technical White Paper, Oct. 2007, 30 pages.
Clearwell Systems, The Clearwell E-Discovery Platform®, http://www.clearwellsystems.com/products/e-discovery-platform, Downloaded Feb. 20, 2008 2 pages.
Clearwell Systems, The Clearwell E-Discovery Platform: Analysis, http://www.clearwellsystems.com/product/e-discovery-analysis.php, Downloaded Feb. 20, 2008, 1 page.
Clearwell Systems, the Clearwell E-Discovery Platform: Case Management, http://www.clearwellsystems.com/products/e-discovery-case-management, Downloaded Feb. 20, 2008 2 pages.
Clearwell Systems The Clearwell E-Discovery Platform: Processing, http://www.clearwellsystems.com/products/e-discovery-processing.php, Downloaded Feb. 20, 2008, 2 pages.
Clearwell Systems The Clearwell E-Discovery Platform: Review, http://www.clearwellsystems.com/products/e-discovery-review.php, Downloaded Feb. 20, 2008 2 pages.
Clearwell Systems The Clearwell E-Discovery Platform: Search &Cull-Down, http://www.clearwellsystems.com/products/e-discovery-search-cull.php, Downloaded Feb. 20, 2008 1 page.
Dale, et al., "Programming and Problem Solving with C++," 2002, Jones and Bartlett Publishers, 3rd Edition, pp. 653-662.
Deitel, et al., "C++—How to Program," 2001, Prentice Hall, 3rd Edition, pp. 273-279.
Fast, Fast ESP Revitalizing your search experience with intelligent, user-centric search, 2007, Fast Search & Transfer ASA. , 6 pages.
Google, Google Search Appliance, http://www.google.com/enterprise/gsa/, Downloaded, Feb. 20, 2008, 2 pages.
Guidance Software, EnCase® eDiscovery Suite, http://www.guidancesoftware.com/products/ediscovery_index.aspx, Downloaded Feb. 20, 2008, 2 pages.
Kaufman, et al., "Network Security-Private Communication in a Public World," 1995, Prentice, Hall PTR, p. 80.
Koch, et al., "Oracle8—The Complete Reference," 1997, Osborn McGraw-Hill, pp. 9-7 and 51-62.
Krishnaprasad, Muralidhar, et al, Oracle Searching Enterprise Applications (Siebel 7,8 and E-Business Suite 11i) with Oracle Secure Enterprise Search 10.1.8, An Oracle White Paper, Jan. 2007, 25 pages.
Oracle Secure Enterprise Search 10G, Mar. 2006, 8 pages.
Oracle8™ Tuning, Release 8.0, Dec. 1997, Oracle®.
PCT Search Report PCT /US03/30178 dated Mar. 11, 2004, 5 pages.
PCT Search Report PCT /US06/5317 dated Jul. 24, 2006, 5 pages.
Zantaz, Enterprise Archive Solution (EAS) Product family, Datasheet, 4 pages.
Office Action for U.S. Appl. No. 10/247,002 mailed Mar. 3, 2006.
Office Action for U.S. Appl. No. 10/247,002 mailed Aug. 21, 2006.
Office Action for U.S. Appl. No. 10/247,002 mailed Jan. 23, 2007.
Office Action for U.S. Appl. No. 10/247,002 mailed Sep. 17, 2007.
Office Action for U.S. Appl. No. 10/247,002 mailed Dec. 12, 2007.
Office Action for U.S. Appl. No. 10/247,002 mailed Jun. 18, 2008.
Office Action for U.S. Appl. No. 10/247,002 mailed Nov. 25, 2008.
Office Action for U.S. Appl. No. 10/431,145 mailed Oct. 23, 2006.
Office Action for U.S. Appl. No. 10/431,145 mailed Jul. 26, 2007.
Office Action for U.S. Appl. No. 10/431,145 mailed Feb. 25, 2008.
Notice of Allowance for U.S. Appl. No. 10/431,145 mailed Aug. 20, 2008.
Office Action for U.S. Appl. No. 10/607,718 mailed Feb. 10, 2006.
Office Action for U.S. Appl. No. 10/607,718 mailed Jun. 28, 2006.
Office Action for U.S. Appl. No. 10/607,718 mailed Nov. 15, 2006.
Office Action for U.S. Appl. No. 10/607,718 mailed Jul. 10, 2007.
Office Action for U.S. Appl. No. 10/607,718 mailed Jan. 8, 2008.
Office Action for U.S. Appl. No. 10/607,718 mailed Jul. 3, 2008.
Office Action for U.S. Appl. No. 10/607,718 mailed May 1, 2009.
Office Action for U.S. Appl. No. 10/833,538 mailed Oct. 31, 2006.
Office Action for U.S. Appl. No. 10/833,538 mailed Jul. 23, 2007.
Office Action for U.S. Appl. No. 10/833,538 mailed Feb. 14, 2008.
Notice of Allowance for U.S. Appl. No. 10/833,538 mailed Aug. 6, 2008.
Office Action for U.S. Appl. No. 10/892,982 mailed Jan. 23, 2007.
Office Action for U.S. Appl. No. 10/892,982 mailed Sep. 17, 2007.
Office Action for U.S. Appl. No. 10/892,982 mailed Apr. 8, 2008.
Office Action for U.S. Appl. No. 10/892,982 mailed Oct. 27, 2008.
Office Action for U.S. Appl. No. 10/892,982 mailed Feb. 12, 2009.
Office Action for U.S. Appl. No. 10/892,615 mailed Apr. 27, 2007.
Office Action for U.S. Appl. No. 10/892,615 mailed Dec. 12, 2007.
Office Action for U.S. Appl. No. 10/892,615 mailed Apr. 21, 2008.
Office Action for U.S. Appl. No. 10/892,615 mailed Dec. 5, 2008.
Office Action for U.S. Appl. No. 10/892,615 mailed May 12, 2009.
Office Action for U.S. Appl. No. 11/057,988 mailed Aug. 18, 2008.
Office Action for U.S. Appl. No. 11/057,988 mailed Jan. 28, 2009.
Office Action for U.S. Appl. No. 11/058,551 mailed Sep. 9, 2008.
Office Action for U.S. Appl. No. 11/058,551 mailed Mar. 20, 2009.
(CISCO) A Report From Ironport Systems , "Data Loss Prevention Best Practices—Managing Sensitive Data in the Enterprise", 2007, 21 pages.
Menezes, et al. "Handbook of Applied Cryptography", 1997, p. 389.
GB0921722.5 Search Report dated Mar. 26, 2010, 1 page.
Shapiro, William, et al., "How to Manage Persistent State in DRM Systems," Available at https://www.springerlink.com/content/9h0xrubltc9abegw/fulltext.pdf, Published 2002.
White, Ron, "How Computers Work" Que Coporation, 6th Edition, 2002, pp. 12-15 and 304.
Office Action for U.S. Appl. No. 10/247,002 mailed May 21, 2009.
Office Action for U.S. Appl. No. 10/247,002 mailed Dec. 31, 2009.
Notice of Allowance for U.S. Appl. No. 10/431,145 mailed Jun. 5, 2009.
Office Action for U.S. Appl. No. 12/490,258 mailed Mar. 31, 2011.
Office Action for U.S. Appl. No. 12/490,258 mailed Dec. 6, 2011.

(56) References Cited

OTHER PUBLICATIONS

Office Action for U.S. Appl. No. 10/607,718 mailed Nov. 14, 2008.
Office Action for U.S. Appl. No. 10/607,718 mailed Nov. 9, 2009.
Office Action for U.S. Appl. No. 10/607,718 mailed Apr. 12, 2010.
Office Action for U.S. Appl. No. 10/607,718 mailed Aug. 17, 2010.
Office Action for U.S. Appl. No. 10/607,718 mailed Feb. 3, 2011.
Notice of Allowance for U.S. Appl. No. 12/266,545 mailed Mar. 25, 2011.
Office Action for U.S. Appl. No. 10/892,982 mailed Jul. 20, 2009.
Office Action for U.S. Appl. No. 10/892,982 mailed Jan. 6, 2010.
Office Action for U.S. Appl. No. 12/982,750 mailed Apr. 11, 2011.
Office Action for U.S. Appl. No. 12/982,750 mailed Sep. 7, 2011.
Office Action for U.S. Appl. No. 10/892,615 mailed Mar. 24, 2010.
Office Action for U.S. Appl. No. 10/892,615 mailed Nov. 16, 2011.
Office Action for U.S. Appl. No. 11/057,988 mailed Jul. 10, 2009.
Office Action for U.S. Appl. No. 11/057,988 mailed Mar. 18, 2010.
Office Action for U.S. Appl. No. 11/058,551 mailed Sep. 11, 2009.
Office Action for U.S. Appl. No. 11/058,551 mailed Mar. 8, 2010.
Office Action for U.S. Appl. No. 11/058,551 mailed Aug. 2, 2010.
Office Action for U.S. Appl. No. 11/058,551 mailed Apr. 11, 2011.
Office Action for U.S. Appl. No. 12/079,719 mailed Jan. 21, 2011.
Office Action for U.S. Appl. No. 12/079,660 mailed Dec. 22, 2010.
Office Action for U.S. Appl. No. 12/342,038 mailed May 3, 2011.
Office Action for U.S. Appl. No. 12/410,432 mailed Jul. 29, 2011.
Office Action for U.S. Appl. No. 12/632,620 mailed Dec. 7, 2011.
Office Action for U.S. Appl. No. 12/982,750 mailed Dec. 30, 2011.
Office Action for U.S. Appl. No. 12/342,038 mailed Oct. 26, 2011.
Office Action for U.S. Appl. No. 13/168,926, mailed Nov. 8, 2011.
Office Action for U.S. Appl. No. 13/168,926, mailed Jan. 25, 2012.
Lupu, Emil et al. A Policy Based Role Object Model, EDOC '97 Proceedings, Pub Date 1997. Imperial College, Deparment of Computing, Relevant pp. 36-37.
Lymberopoulos, Leonidas et al., "An Adaptive Policy Based Management Framework for Differentiated Services Networks," Third International Workshop on Policies for Distributed Systems, 2002, Relevant pp. 147-158, <http://ieeexplore.ieee.org/stamp/stamp.jsp?tp=&arnumber=1011302>.
USPTO; Office Action for U.S. Appl. No. 10/247,002 mailed Oct. 7, 2013.
USPTO Notice of Allowance for U.S. Appl. No. 12/490,258 mailed Jun. 26, 2011.
USPTO; Notice of Allowance for U.S. Appl. No. 10/607,718 mailed Jun. 17, 2011.
USPTO Office Action for U.S. Appl. No. 13/246,774 mailed Dec. 7, 2012.
USPTO Office Action for U.S. Appl. No. 13/246,774 mailed Sep. 11, 2013.
Office Action for U.S. Appl. No. 12/632,620 mailed Apr. 24, 2012.
USPTO Notice of Allowance for U.S. Appl. No. 12/632,620 mailed Jun. 10, 2013.
USPTO Notice of Allowance for U.S. Appl. No. 10/892,982 mailed Dec. 6, 2010.
USPTO Office Action for U.S. Appl. No. 12/982,750 mailed Dec. 30, 2011.
USPTO Office Action for U.S. Appl. No. 12/982,750 mailed Jul. 11, 2012.
USPTO Office Action for U.S. Appl. No. 12/982,750 mailed Apr. 2, 2012.
USPTO Notice of Allowance for U.S. Appl. No. 12/982,750 mailed Jul. 22, 2013.
USPTO, Notice of Allowance for U.S. Appl. No. 10/892,615 mailed Mar. 14, 2012.
USPTO, Office Action for U.S. Appl. No. 13/532,660 mailed Apr. 11, 2013.
USPTO; Office Action for U.S. Appl. No. 13/532,660, mailed Aug. 14, 2013.
USPTO, Notice of Allowance for U.S. Appl. No. 11/057,988 mailed Mar. 18, 2010.
USPTO Notice of Allowance for U.S. Appl. No. 12/079,719 mailed Jan. 21, 2011.
USPTO Office Action for U.S. Appl. No. 12/079,630 mailed Aug. 31, 2010.
USPTO, Notice of Allowance Action for U.S. Appl. No. 12/079,630 mailed Mar. 24, 2011.
USPTO, Notice of Allowance for U.S. Appl. No. 13/168,926, mailed Apr. 16, 2012.
USPTO, Office Action for U.S. Appl. No. 12/079,660 mailed Aug. 19, 2010.
USPTO, Office Action for U.S. Appl. No. 12/079,660 mailed Mar. 31, 2011.
USPTO Office Action for U.S. Appl. No. 13/174,718 mailed Mar. 19, 2013.
USPTO, Office Action for U.S. Appl. No. 12/409,449 mailed Mar. 12, 2012.
USPTO Office Action for U.S. Appl. No. 12/409,449 mailed Aug. 14, 2012.
USPTO, Office Action for U.S. Appl. No. 12/346,606 mailed Jun. 8, 2012.
USPTO, Office Action for U.S. Appl. No. 12/346,606 mailed Dec. 14, 2012.
USPTO, Office Action for U.S. Appl. No. 12/342,038 mailed May 15, 2012.
USPTO, Office Action for U.S. Appl. No. 12/342,038 mailed May 8, 2013.
USPTO; Notice of Allowance for U.S. Appl. No. 12/342,038, mailed Aug. 20, 2013.
USPTO Office Action for U.S. Appl. No. 12/410,432 mailed Dec. 16, 2011.
USPTO Notice of Allowance for U.S. Appl. No. 13/246,774 mailed Jan. 29, 2014.
USPTO Office Action for U.S. Appl. No. 13/174,718 mailed Jul. 22, 2013.
USPTO Office Action for U.S. Appl. No. 13/174,718 mailed Dec. 24, 2013.

* cited by examiner

SELECTIVE REMOVAL OF PROTECTED CONTENT FROM WEB REQUESTS SENT TO AN INTERACTIVE WEBSITE

RELATED APPLICATIONS

This application claims the benefit of U.S. Provisional Application No. 61/098,207, filed Sep. 18, 2008.

FIELD OF INVENTION

Embodiments of the invention relate to the field of processing data, and more particularly, to selectively removing protected content from web requests to interactive websites.

BACKGROUND OF THE INVENTION

A modern organization typically maintains a data storage system to store and deliver records concerning various significant business aspects of the organization. Stored records may include data on customers (or patients), pricing, contracts, deliveries, supplies, employees, manufacturing, etc. A data storage system of an organization may utilize relational databases, client/server applications built on top of relational databases (e.g., Oracle, Microsoft, Siebel, SAP, etc.), object-oriented databases, object-relational databases, document stores and file systems that store table formatted data (e.g., CSV files, Microsoft Excel spreadsheet files, etc.), password systems, single-sign-on systems, etc.

A data storage system of an organization typically runs on a computer connected to a local area network (LAN). This computer may be made accessible to the Internet via a firewall, router, or other packet switching devices. Although the connectivity of a storage system to the network provides for more efficient utilization of information maintained by the storage system, it also poses security problems due to the highly sensitive nature of this information. In particular, because access to the contents of the data storage system is essential to the job function of many employees in the organization, there are many possible points of possible theft or accidental distribution of this information. Theft of information represents a significant business risk both in terms of the value of the intellectual property as well as the legal liabilities related to regulatory compliance. In order to prevent malicious and unintentional data breaches, commercial and government regulations often impose restrictions on how confidential data may be stored, the format of confidential data, who can access that confidential data, as well as whether confidential data may be transmitted (e.g., by email). In order to comply with these regulations, companies create policies to govern how confidential data is stored in the various applications, in what format the confidential information is stored, who can access that confidential data, and to prevent transmission of confidential data.

Some conventional systems employ a blanket Data Loss Prevention (DLP) policy to accurately detect policy violations in information transfers of the protected data between one or more parties. The DLP policy includes conditions that define the information to be protected (e.g., confidential information) and an action that needs to be taken when any event matches this condition. The protected information can leave an organization through web operations, such as using Hypertext Transfer Protocol (HTTP) or HTTPS requests, or by file transfers, such as using File Transfer Protocol (FTP). The protected information can also leave an organization through other network protocols, such as Simple Mail Transfer Protocol (SMTP), Transmission Control Protocol (TCP), etc. While the Internet has provided a platform for information sharing and communication, it has also opened paths for confidential data to leave an organization in day to day activities on websites, such as through webmail applications, blogs, and discussion groups. Loss of sensitive data through websites can be controlled by blocking the outgoing web request that triggers the DLP violation and sending notification back to a user as a response for this web request. This scheme may work fine for web requests sent to non-interactive websites, where the web requests are generated as a result of end user action. This conventional scheme, however, may be unfavorable for web requests sent to highly-interactive websites (e.g., Web 2.0 websites). For example, the Web 2.0 websites allow users to do more than just retrieve information, but can also provide "Network as platform" computing, allowing users to run web-based applications entirely through a web browser, for example. Although sensitive data leaving an organization through websites can be blocked by conventional DLP solutions, highly-interactive interfaces, as seen in highly-interactive websites, do not handle this block operation effectively and can lead to poor user experiences by making the web-based interactive application unstable or even cause the web-based application to crash. It is also hard to decipher application errors caused by the block operation. Creating customized responses for each Web 2.0 website for DLP purposes would be an arduous task, which can easily become invalid once the website changes its underlying technology.

SUMMARY OF THE INVENTION

A method and apparatus for selectively removing a data element that triggers a policy violation from a web request to an interactive website. In one embodiment, a computer-implemented method identifies a policy for protecting source data, having a plurality of data elements. The method further evaluates a web request sent to an interactive website as part of a web-based application, and determines that the web request includes at least one of the plurality of data elements triggering a violation of the policy. The method determines the data boundaries of the web request, and selectively removes data content within the data boundaries containing the at least one data element that triggered the violation to allow the web request to be processed by the interactive website as if it were the original web request containing the at least one data element.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
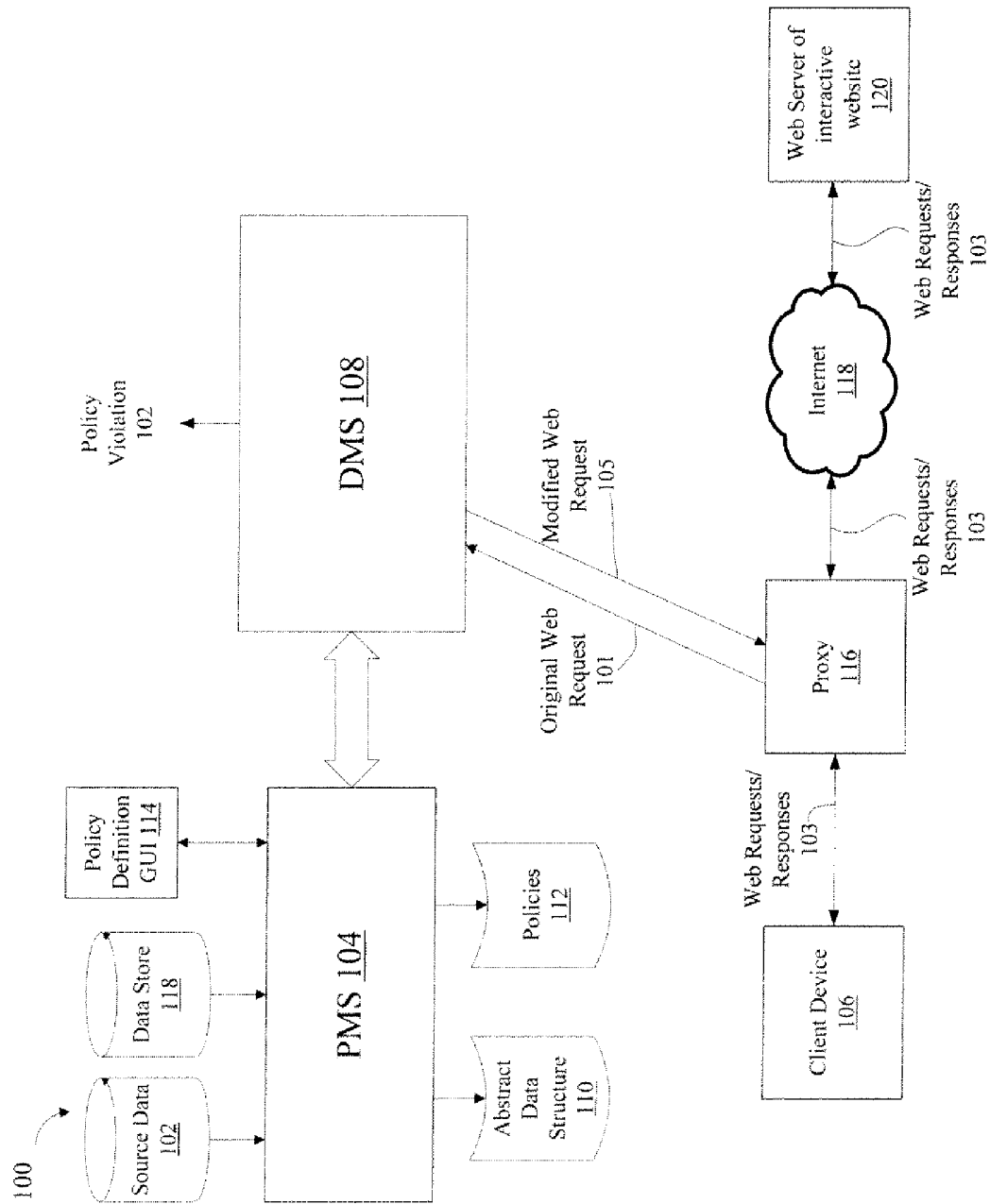
FIG. 1 illustrates one embodiment of exemplary system architecture for providing data loss protection with support for selective removal of protected content in web requests to an interactive website.

A method and apparatus for selectively removing a data element that triggers a policy violation from a web request sent to an interactive website. In one embodiment, a data monitoring system (DMS) identifies a policy for protecting source data, having a plurality of data elements. The DMS further evaluates a web request sent to an interactive website as part of a web-based application, and determines that the web request includes at least one of the data elements triggering a violation of the policy. The DMS determines the data boundaries of the web request, and selectively removes data content within the data boundaries containing the at least one data element that triggered the violation to allow the web request to be processed by the interactive website as if it were the original web request containing the at least one data element.

As described above, protected information can leave an organization through web operations, using web requests (e.g., HTTP, HTTPS, as well as other protocols), for example, sending webmail messages, and publishing information on blogs, discussion groups, or the like. In order to prevent data loss occurrence, one or more DLP engines (e.g., DMS 104 of FIG. 1) are coupled with a proxy in an organization's network. End user web requests and corresponding responses can be routed to and from the Internet through the proxy, which can be enabled in transparent or explicit mode of operation. These web requests are forwarded by the proxy to the DLP engines for DLP inspection. The DLP engines decide whether these web requests will go through, be blocked or be modified, as described herein.

As described above, loss of sensitive data through websites can be controlled by blocking the outgoing web request that triggers the DLP violation and sending notification back to the requesting client as a response for this request. As described above, this conventional scheme, however, may be unfavorable for web requests sent to highly-interactive websites (e.g., Web 2.0 websites). Instead of creating customized responses for each highly-interactive website for DLP purposes, the embodiments described herein are directed at selectively removing the data content that triggers the policy, allowing the web request to be processed by the interactive website as if it were the original web request containing the violating data element(s).

The embodiments described herein are directed to ensuring seamless interaction with these interactive websites as well as preventing data loss occurrence by selectively removing sensitive content from these web requests. Selectively removing content from requests may include two tasks: 1) determining what content violates a policy; and 2) intelligently removing the content. In one embodiment, all requests undergoing DLP inspection can be processed by a content matching engine. This engine can determine whether a web request violated any policy, and if it does, what component (attachment, file uploads, message body, etc.) of the request triggered this rule.

The web requests that undergo selective content removal should look akin to the one that did not undergo content removal, and should get processed by the destination server as if it were the original web request. Analyzing web request syntax can aid in determining different content boundaries, which are captured in a request grammar using an expression language. Using the feedback from the content matching engine and the request grammar, DLP engine can selectively remove content from appropriate data boundaries and set parameters (e.g., the web request length) appropriately, so that the modified web request gets processed by the interactive website as is if it were the original request.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of exemplary system architecture 100 for providing data loss protection with support for selective removal of protected content in web requests to an interactive website. The system 100 includes a policy management system (PMS) 104 and a DMS 108. The PMS 104 and the DMS 108 may be coupled to a computer network that communicates any of the standard protocols for the exchange of information. They may run on one Local Area Network (LAN) and may be incorporated into the same physical or logical system, or different physical or logical systems. Alternatively, the PMS 104 and DMS 108 may reside on different LANs that may be coupled together via the Internet but separated by firewalls, routers, and/or other network devices. In yet another configuration, the PMS 104 may reside on a server, and the DMS 108 may reside on a client device to detect policy violations in the web requests initiated by the client device, which may be coupled to the server via a public network (e.g., the Internet) or a private network (e.g., LAN). It should be noted that various other network configurations can be used including, for example, hosted configurations, distributed configurations, centralized configurations, etc.

The PMS 104 is responsible for receiving parameters pertaining to policies, such as pre-configured template policies or customized policies, and creating policies based on these policy parameters. In one embodiment, the PMS 104 receives the policy parameters via the policy definition graphical user interface (GUI) 114. In another embodiment, the PMS 104 receives the policy parameters from an Application Programming Interface (API) or via a configuration file formatted in text or a defined data format (e.g., extensible markup language (XML) or binary format). The PMS 104 may create policies 112 based on regulations concerning handling of sensitive information maintained by an organization, or based on corporate data governance rules. The regulations may include, for example, the Health Insurance Portability and Accountability Act (HIPAA) ensuring the confidentiality of electronic protected health information, California Senate Bill 1 (SB1) or Senate Bill 1386 (SB1386) controlling customer information leaving the company and affiliates, the Gramm-Leach-Bliley Financial Services Modernization Act controlling customer information leaving a financial institution, the Cardholder Information Security Program (CISP) controlling handling of customer credit card information maintained by an organization, or the like. In one embodiment, the PMS 104 may use policy templates or customized policies pre-configured based on input provided by individuals familiar with the relevant regulations or corporate data governance rules.

The policy 112 may include a set of rules that specify which information should be present in a web request to trigger a violation. The set of rules may provide specific conditions for triggering a violation, such as inclusion of a keyword(s) or regular expression pattern in a web request, such as for a webmail message, a blog post, or the like. For example, the set of rules may require that a web request be modified if it contains fragments that match information from specific columns of any single row within the pre-selected data. In some embodiments, the action policy includes rules requiring a specific action if the web request contains a certain keyword(s) or an expression matching a certain regular expression pattern. In other embodiments, the action policy may contain exception clauses that identify exceptions to this policy's rules, such as specific web addresses of an interactive website, or a specific web domain. The rules in the policy may be combined using logical connectives of first-order logic (e.g., AND, OR, NAND, NOR, NOT, equivalent, nonequivalent, or the like). A web request is sent to an interactive website as part of a web-based application. The web-based applications may be applications that are accessed via a web browser over a network, such as through the Internet or an intranet, and can be run entirely through a web browser. Web-based applications are popular due to the ubiquity of web browsers, the convenience of using a web browser as a client, and the ability to update and maintain web applications without distributing and installing the application on each individual client device. Common web-based applications include webmail, online retail sales, online auctions, wikis, and the like. The web-based application generates one or more web requests and sends the web requests to the interactive website.

The policy 112 specifies source data 102 that should be protected from unauthorized transmission, access or any other use. In one embodiment, the source data 102 is stored in a tabular format (e.g., data in a relational database, data maintained by client/server applications built on top of relational databases, data in document and file systems that store table formatted data (e.g., CSV files or Excel spreadsheet files), etc.). In another embodiment, the source data 101 is stored in a non-tabular format but convertible to a tabular format (e.g., data stored as comma separated values in a flat file, a password database or a single-sign-on system, relational data in an object-oriented database, etc.). Alternatively, the source data 102 may not be convertible to a tabular format (e.g., content of documents or files). The policy 112 may also specify which elements of the source data 102 should be included in a web request to trigger a policy violation. In one embodiment, the PMS 104 extracts copies of the source data 102 and derives from that data an abstract data structure 110. The abstract data structure 110 may be created periodically and sent, or otherwise provided to the DMS 108, along with the policy 112 that is to be implemented.

In the depicted embodiment, the DMS 108 is responsible for monitoring web request 103 based on the abstract data structure 110 and policies 112 to detect data elements of the source data that violate policies. A client device 106 may communicate with an interactive website hosting a web-based application through the Internet 118. The interactive website may be hosted by, or served from, the web server 120. In other embodiments, the interactive website may be operated on another type of server than a web server, as would be appreciated by one of ordinary skill in the art having the benefit of this disclosure. When the client device 106 accesses the web-based application, the web-based application may start running on the client device 106, interacting with the user of the client device 106 and causing the web browser, operating on the client device 106, to send the web request 103 and to receive the corresponding response through proxy 116. The web request 103 may include user input, such as free-form text or form data. The proxy 116 may be a dedicated proxy server, or alternatively, may be a proxy service operating on a device connected to the Internet 118. In one embodiment, the DMS 108 are coupled with the proxy 116, for example within the same network (e.g., LAN). In another embodiment, the DMS 108 resides external to the network in which the proxy 116 resides. Alternatively, other configurations are possible. The end-user web requests 103 can be routed to/from the Internet 118 through the proxy 116, which can be enabled in a transparent mode, or in an explicit mode of operation. The proxy 116 intercepts the web requests 103, and forwards each request to the DMS 108 for DLP inspection as an original web request 101. The DMS 108 decides whether the original web request 101 should be forwarded to the web server 120 as is, be blocked, or be modified. If the DMS 108 decides to modify the original web request 101, the DMS 108 forwards the modified web request 105 to the proxy 116, which sends the modified request 105 to the web server 120. If the DMS 108 decides not to modify the original web request 101, the DMS 108 forwards the unmodified web request to the proxy 116, which sends the unmodified request to the web server 120. If the DMS 108 decides to block the original web request 101, the DMS 108 creates a response that contains the block notification message and sends it back to the proxy 116. The proxy 116 on receiving this blocked response forwards it to the client device 106 and drops the original web request, meaning the proxy 116 does not send this request to the web server 120.

As described above, blocking the outgoing web request that triggers DLP violation may be unfavorable for highly-interactive clients, where many background web requests are performing different tasks, and, at times, not in response to end user action. The DMS 108 can selectively remove data content of the original web request 101 that triggers the policy violation, and send the modified web request 105, avoiding instability in the web-based application and crashes. Since the modified request 105 has the format of the original web request 101, the web request 105 can be processed by the interactive website, operating on the web server 120, as if it were the original web request 101, containing the data content that triggered the policy violation.

In another embodiment, once the DMS 108 has selectively removed the data content that triggers the policy violation, the DMS 108 may reevaluate the modified web request 105 to validate that the data elements that triggered the violation have been successfully removed from the web request before sending it to the web server 120.

In one exemplary embodiment, the source data includes data elements to be protected. For example, the data elements, such as an employee's name and corresponding social security number, will be part of the source data stored in a database. The DMS 108, in evaluating the web request 101, detects the employee's name and social security number in the web request. In one embodiment, once the DMS 108 has detected a potential policy violation, the DMS 108 determines whether to allow the transfer of the web request 101, modify the web request, or block the web request. If a specific policy is violated, the DMS 108 can report the policy violation to an appropriate entity (e.g., a manager, database administrator, a reporting system, etc.) or perform some other action. In one embodiment, the DMS 108 reports the policy violation by generating a policy violation report. When the DMS 108 detects several policy violations in the web request 101, each of the data elements triggering a violation can be selectively removed by the DMS 108, and the DMS 108 can report the policy violations individually or collectively. When the DMS 108 determines that a web request being evaluated includes one or more tokens that violate a specific policy, the DMS 108 can selectively remove the tokens from the web request, as described herein.

In exemplary embodiment, the client device 106, running a web-based mail application on a web browser, sends a webmail message to the interactive website, operating on the web server 120, over the Internet 118. In this embodiment, a user logins into an email account in the web browser, and composes a new message or replies to an existing message. The user may also attach one or more files as attachments to the webmail message using a file upload operation. The webmail message may contain sensitive information, which is protected by a DLP policy. The client device 106 generates a web request to send the webmail message to the interactive website. The client device 106 passes the HTTP Post request through the corporate web proxy (e.g., proxy 116). The web proxy redirects the POST request to the DMS 108 for DLP inspection. The DMS 108 evaluates the POST request for any sensitive information according to the policy, and sends the response to the web proxy, including the modified POST request in which the violating content has been selectively removed. The web proxy sends the modified POST request to the web server 120 hosting the web-based application of the interactive website. For example, the webmail message may include sensitive information in the body of the webmail message, and may include two attachments, one attachment containing sensitive information, and the other not containing sensitive information. The DMS 108 can selectively remove the sensitive information in the body of the webmail message, and replace the attachment containing sensitive information with a marker file. The DMS 108 does not modify the second attachment that does not contain sensitive information (i.e., keeps the second file as the original attachment). The DMS 108 recomposes a modified web request without the selectively-removed content and replaced attachment, and passes the modified web request to the interactive website, preventing a data loss occurrence. The interactive website processes the modified web request as if it were the original web request.

In another exemplary embodiment, the client device 106 sends a HTTPS POST request through the web proxy. This embodiment is similar to the one described above, but the web proxy removes the Secure Sockets Layer (SSL) of the HTTPS POST request and redirects the HTTP POST request to the DMS 108. Upon receiving the modified POST request from the DMS 108, the web proxy re-encrypts the modified HTTP request from the DMS 108 into HTTPS POST request and forwards the request to the interactive website through the Internet 118.

Figure 2:
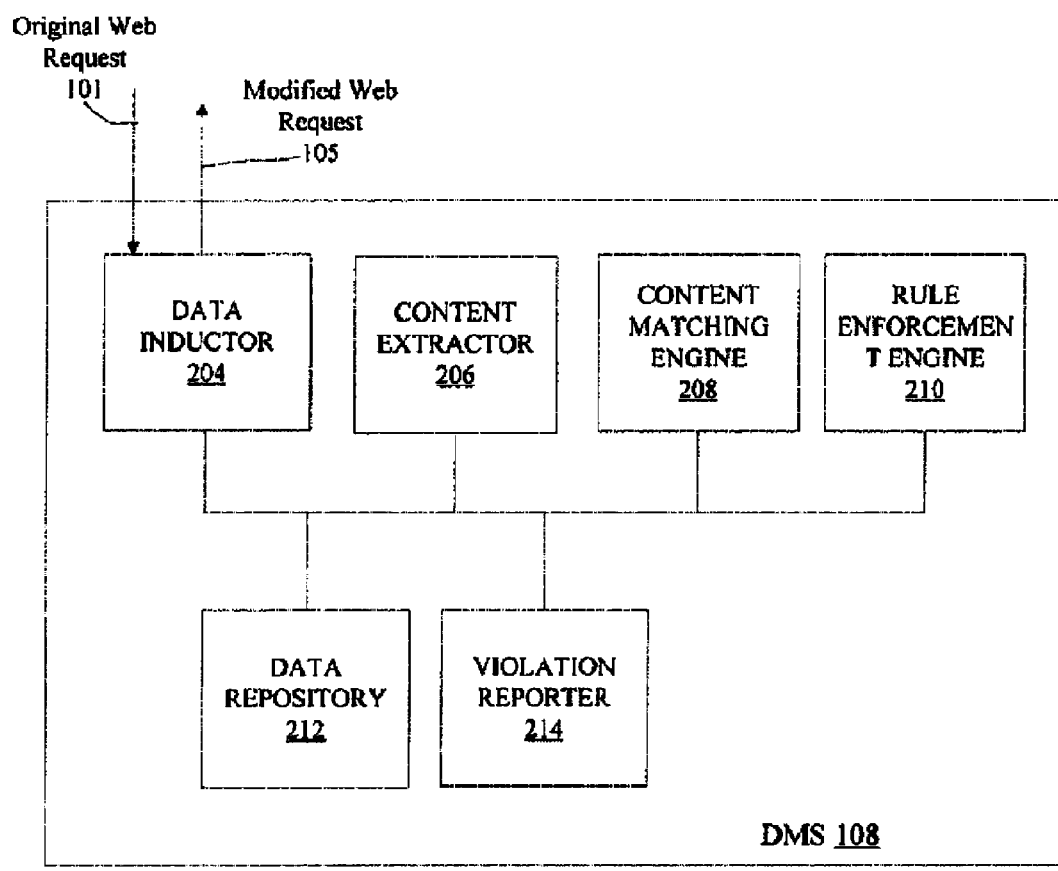
FIG. 2 is a block diagram of one embodiment of a DMS.

FIG. 2 is a block diagram of one embodiment of a DMS 108. The DMS 108 may include a data inductor 204, a content extractor 206, a content matching engine 208 (also referred to as a search engine), a rule enforcement engine 210, a data repository 212, and a violation reporter 214. In other embodiments, the DMS may include more or less components than those depicted in FIG. 2.

The data inductor 204 is responsible for receiving the web requests sent to an interactive website. In one embodiment, the data inductor 204 has open communication channels with the proxy 116. The proxy 116 intercepts the web request sent to the interactive website, for example, from a web browser operating on the client device 106 and forwards the web request to the data inductor 204. Upon receiving the original web request 101, the data inductor 204 decomposes the web request in different components, such as, for example, the HTTP Universal Resource Identifier (URI), HTTP headers, HTTP Body (which may be the webmail message body). Alternatively, the data inductor 204 can decompose the web request in different ways, such as by creating key value pairs for headers, creating an XML graph representation, or the like.

The content extractor 206 is responsible for extracting different data content within the component that can be further analyzed by the content matching engine 208. For example, the content extractor 206 can be used to extract data content of a web request that is not in plain text so that the text of the web request can be evaluated by the content matching engine 208. For example, the content extractor 206 can be used to extract text from an attachment file of the web request, such as during a file upload operation. Also, in the case of attached archive files (e.g., zip, tar, etc), the content extractor 206 can extract content from each of the files in the archive. The content extractor 206 can extract data content from various file types, and create different components of the web request to be evaluated by the content matching engine 208.

The content matching engine 208 is responsible for searching the data content of the web request for data elements from the source data based on the specific policy. Exemplary techniques to search web requests for table-based source data will be discussed in more detail below in conjunction with FIGS. 6A, 6B and 6C. It should be noted, however, that various other techniques can be used for searching web requests without limiting the scope of the present invention.

In one embodiment, the content matching engine 208 detects violations of the policy in the original web request 101 by determining whether the web request includes data elements that match any of the data elements of the source data (e.g., that match one or more rows of the abstract data structure 110).

The rule enforcement engine 210 is responsible for performing an appropriate action, as defined by a policy, if a web request or a component of a web request contains protected data that triggers a violation of the policy. For example, the rule enforcement engine 210 may block the web request, reroute the web request, or modify the web request using the selective content removal process described herein. In one embodiment, when performing the selective content removal process, the rule enforcement engine 210 determines data boundaries of the original web request 101, and selectively removes the data elements triggering the violation within the data boundaries.

In one embodiment, if the content matching engine 208 detects a DLP violation, the content matching engine 208 records the component in which there is a violation. Using the recorded information, the rule enforcement engine 210 can execute the action on the component that has the DLP violation, including determining data boundaries within the component that need to be removed and selectively removing the data content triggering the violation within the component. In another embodiment, the content matching engine 208 records the presence of different matches and match ranges in each component, and can report this information to the rule enforcement engine 210. The rule enforcement engine 210 may use this reported information for specific field request redaction.

In one embodiment, the rule enforcement engine 210 can resubmit the modified web request 105 to the content matching engine 210 to validate the selective content removal operations. For example, the rule enforcement engine 210 can send the modified web request back to the content matching engine 208 at the end of the selective content removal operations. If the content matching engine 208 reports no sensitive information match for the resubmitted web request, then the rule enforcement engine 210 can allow the validated web request to be sent to the interactive website by way of the proxy 116. However, if the content matching engine 208 reports a DLP violation for the resubmitted web request, then the rule enforcement engine 210 can execute a secondary action on the web request, such as blocking the resubmitted web request and sending notification back to the client device 106 that sent the original web request 101. This secondary action can be to block the entire web request or to allow the web request to pass through to the interactive website unmodified. Although the user experience may be poor if the web request is blocked, blocking will prevent the data loss occurrence. An organization can opt for blocking web requests as a secondary action to ensure data loss prevention or letting it go through to reduce helpdesk calls.

In one embodiment, the rule enforcement engine 210 executes the secondary action in cases where rule enforcement engine 210 is unsuccessful in removing the protected content. The rule enforcement engine 210 may be unsuccessful due to changes in web request syntax of a particular website or due to the absence of request grammar rule for the particular URI. In one embodiment, the rule enforcement engine 210 generates an incident report for the DLP violation to report the unsuccessful removal event due to change in syntax, incomplete grammar rule for the particular website, and the violation reporter 214 may report the incident report to an administrator for further corrective actions, for example.

In one embodiment, the rule enforcement engine 210 can introduce a special HTTP header to the modified web request 105 that is sent back to the content matching engine 208. The special HTTP header indicates that the web request is a resubmission for content validation. In one embodiment, after the content matching engine 208 determines that the resubmitted web request does not trigger a violation, the rule enforcement engine 210 removes the special HTTP header from the validated web request before sending the web request to the proxy 116. Alternatively, the proxy 116 may remove the special HTTP header before sending the web request to the interactive website.

It should be noted that although the resubmission of the modified web request may introduce additional delay to the web request, the resubmission validates the correctness of the request grammar rule, as well as the selective content removal operation performed by the rule enforcement engine 210, preventing data loss occurrence.

The data repository 212 is responsible for storing different policies, such as the policies 112 described above with respect to the PMS 104. In one embodiment, the data repository 212 receives the policies 112 from the PMS 104. In another embodiment, the data repository 212 receives the policy 112 and the abstract data structure 110 from the PMS 104.

The violation reporter 214 is responsible for notifying an appropriate entity of a detected violation (e.g., via a user interface, an email message, etc.). The violation reporter 214 may generate an incident report for each violation, or alternatively, for each web request that violates at least one policy.

In one embodiment, the web request uses HTTP or HTTPS as an application-level protocol, and the web request is encapsulated according to a data structure specified by the interactive website. The rule enforcement engine 210 may determine the data boundaries of the web request by using a request grammar rule. In one embodiment, the request grammar rule is expressed in Backus-Naur Form (BNF) like notation, and can be used to capture a request structure of the web request (e.g., composition of the web request) sent to interactive website. For example, the request grammar rule can help in identifying the data boundaries within the web request that needs to be redacted. It should be noted that the request grammar is not a formal language used by any of the interactive websites, but is a language used to express request grammar rules that help in representing web requests of different kind to different website in a flexible way. Once the rule enforcement engine 210 has parsed the web request and determined its internal structure, the request grammar rule can aid the rule enforcement engine 210 to determine the data boundaries of the web request from which the content needs to be removed.

In one embodiment, data boundaries of a web request can be determined using an online request grammar that is developed by analyzing the web request using machine learning techniques. Alternatively, a complex web request can be decomposed into small building blocks based on request patterns, for example, creating an XML tree, key value pairs, or the like, for the web request. In this embodiment, the content matching engine 208 can be configured to notify in which block the content violation is found. This feedback from the content matching engine 208 can be used by the rule enforcement engine 210 to determine data boundaries on which content removal operations needs to be performed. Although the embodiments above describe determining the request structures of the web requests at time of the reception of the web request, alternatively, the structures of the web requests can be predetermined offline. For example, using network monitoring and protocol processing tools, the syntax of the web requests can be analyzed to determine the request structure used by a particular interactive website, and a predetermined request grammar rule can be assigned to that particular interactive website. For example, the predetermined request grammar rule may include a URI pattern and the request field description. The assigned URI pattern can be used to match to the request URI in the intercepted web request and the field description to determine data boundaries within the intercepted web request. URI patterns within the predetermined request grammar rules can also be used in performing destination specific content filtering. The data boundaries can refer to specified data ranges within one or more components of the web request. For example, a field in a POST request may contain a concentration of website specific parameters like "<subject>my email</subject><body>hi there</body>". In this case, the data boundaries would define the boundaries around the text "my email" and "hi there". The formatting may vary from website to website. For example, the values may be null terminated name-value pairs instead of xml fragments. The data boundaries delineate the areas of the web request where it is valid to redact data content without redacting the formatting of the web request.

In one embodiment, a request grammar rule can be defined using an expression language. The request grammar rule may include a URI pattern that is used for matching URI requests contained in the received web requests, and an action to be performed in response to detecting the violation in the web request. The request grammar rule may also include an action message to be inserted into the web request to replace the data elements triggering the violation(s). The request grammar rule may also include a field type and description that is used to identify a field of the web request that is to be evaluated for data elements that are likely to trigger a violation. In one embodiment, BNF based expression language is used to define the request grammar rules that aid in determining different data boundaries in web requests sent to different interactive websites that need to be redacted. In other embodiments, other context-free languages may be used other than BNF to define request grammar rules, such as Wirth Syntax Notation (WSN), Extended Backus-Naur form (EBNF), and Augmented Backus-Naur form (ABNF), or other types of context-free grammars that would be appreciated by one of ordinary skill in the art having the benefit of this disclosure.

In one exemplary embodiment, a request grammar rule for Foo Web Mail is as follows:

*.mail.foo.co*::REMOVE, Sensitive content has been removed from this outgoing request as per our Company policies::XPATH:{//message//text}

This example rule includes three parts: 1) A URI pattern, which can be used for matching with request URI of the web request. 2) Action and action message. There can be different actions for different URI patterns. In this case, "REMOVE" is the action, which indicates that the selective content removal operation should take place, and that the action message should replace the violating content with "Sensitive content has been removed from this outgoing request as per our Company policies." The action message can be site specified and may have priority over other generic action messages. 3) Field type and field description. The field type and field description can be used to determine which field of the web request should be evaluated to determine whether the field contains protected content to detect violations of the policy.

The following example illustrates selective content removal using the exemplary request grammar rule described above regarding Foo.com. An employee (Bob) uses his personal webmail account with Foo.com to send a Social Security Number (SSN) of another employee (Eve) to his friend (Alice). Sending SSN information is a data loss event for his organization, which needs to be prevented. The web request for the webmail application is sent through a browser, and is routed to the Foo server, which hosts the webmail application, by way of the organization proxy. One exemplary web request may be expressed as follows:

POST http://abc.mail.foo.com/soap?m=SendMessage HTTP/1.1
Host: abc.mail.foo.com
User-Agent: Mozilla/5.0
Accept:text/xml,application/xml, text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Keep-Alive: 300
Proxy-Connection: keep-alive
SOAPAction: urn:foo:fws#SendMessage
Content-Length: 528
Content-Type: application/xml
<SOAP-ENV:Envelope xmlns:SOAP-ENV="http://schemas.xmlsoap.org/soap/envelope/"
xmlns:xsi="http://www.w3.org/1999/XMLSchema-instance"
xmlns:xsd="http://www.w3.org/1999/XMLSchema"
SOAP-ENV:encodingStyle="http://schemas.xmlsoap.org/soap/encoding/"><SOAP- ENV:Body><m:SendMessage
xmlns:m="urn:foo:fws"><message><to ><email>alice@foo.com</email></to ><from><email>bob@foo.com</email></from><msgbody><text>Here is Eve's ssn 012345678.
</text></msgbody><subject>ssn</subject></message></m:SendMessage></SOAP-
ENV:Body></SOAP-ENV:Envelope>

In this example, the proxy 116 forwards the original web request 101 to the DMS 108 for DLP inspection. The data inductor 204 has communication channels open with the proxy 116, and upon receiving the request, decomposes the web request into different components. For the webmail example above, the decomposition can be HTTP URI, HTTP headers, and HTTP body, which is the web mail body. It should be noted that the data inductor 204 can decompose the same web request in different ways, such as by creating key value pairs for headers, XML graph representation, or the like. The content extractor 206 in this example does not do anything as the content of the webmail message is available in text format. If the employee (Bob) had sent an archive file containing files of different type having protected information, then the content extractor 206 would have extracted content from these files and created web request components from them, which can undergo content inspection by the content matching engine 208. The content matching engine 208 would use different detection algorithms to determine the presence of protected information in each of the components of the web request. If the content matching engine 208 detects a DLP violation, the content matching engine 208 can record the component in which there is a violation, and may even identify the field or data range of the component in which the DLP violation was detected. The rule enforcement engine 210 can execute the action on the component that has the DLP violation, including selectively removing the data content triggering the violation within the component. In one embodiment, the content removal rule also replaces the selectively-removed content with the identified content removal message (e.g., "Sensitive content has been removed from this outgoing request as per our Company policies"). In another embodiment, the content removal rule may include a secondary response action, as described herein.

In another exemplary embodiment, the rule enforcement engine 210 determines the request grammar rule from complete grammar configuration using the request URI present in the HTTP header. The rule enforcement engine 210 uses the feedback from the content matching engine 208 to determine whether the violation is present in the message body, file upload operation, or the like. For example, in the case where the web request for the webmail application is sent to the Foo server, the field type and field description of the request grammar rule (e.g., //message//text) helps identify fields that may need to be redacted. The content matching engine 208 has reported SSN policy violation for the message body. The rule enforcement engine 210 uses this feedback and the field type and field description to identify the following fields from the exemplary web request to the Foo server:

<message>
. . .
<text>Here is Eve's ssn 012345678. </text>
. . .
</message>

If there is no request grammar rule for the particular URI and the violation is in the message body, the rule enforcement engine 210 can execute the secondary action, such as blocking the web request, and sending notification to the client device 106 that requested the original web request 101. If the violation is present in a file upload operation (e.g., attaching files in the webmail application, blog, or the like), the rule enforcement engine 210 uses a file boundary detector to identify the data boundaries in the request structure to identify file start and end locations. The rule enforcement engine 210 replaces the file with a marker file with the content being the action message set in the response rule. This operation may be executed irrespective of whether the request grammar rule is present in grammar configuration or not.

If the violation is present in the web request body, then, using the request grammar rule, the rule enforcement engine 210 determines which data boundaries needs to be selectively removed. Data boundary detection may be done based on the field type set in rule, request header parameters, and/or feedback from content matching engine 208. The rule enforcement engine 210 removes the sensitive content from these data boundaries and places the replacement action message as set in the rule. As described above, the field type and field description of the rule may be used to determine the field which may contain the violating content. For the web mail post by Bob, the "XPATH" query will aid in determining nodes of the Simple Object Access Protocol (SOAP) envelope, and the XML node may be reconstructed with the action message set as its value. SOAP is a protocol specification for exchanging structured information in the implementation of web services in computer networks. SOAP may relay on XML as its request format and usually relies on other application-layer protocols, such as HTTP, HTTPS, or Remote Procedure Call (RPC) for negotiation and transmission of the web request and corresponding responses. Although SOAP is described herein, in other embodiments, other protocols may be used as would be appreciated by one of ordinary skill in the art having the benefit of this disclosure.

The rule enforcement engine 210 can recompose the modified web request from each component and set parameters appropriately, such as request length that enables the external Foo web server to interpret this modified request as if it was the original request. The rule enforcement engine 210 sends the modified web request back to the proxy via the data inductor's communication channels.

One exemplary modified web request is represented below:
POST http://abc.mail.foo.com/soap?m=SendMessage HTTP/1.1 Host: abc.mail.foo.com
User-Agent: Mozilla/5.0
Accept: text/xml,application/xml, text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Keep-Alive: 300
Proxy-Connection: keep-alive
SOAPAction: urn:foo:fws#SendMessage
Content-Length: 588
Content-Type: application/xml
<SOAP-ENV:Envelope xmlns:SOAP-ENV="http://schemas.xmlsoap.org/soap/envelope/"
xmlns:xsi="http://www.w3.org/1999/XMLSchema-instance"
xmlns:xsd="http://www.w3.org/1999/XMLSchema"
SOAP-
ENV: encodingStyle="http://schemas.xmlsoap. org/soap/encoding/"><SOAP-
ENV:Body><m: SendMessage
xmlns:m="urn:foo:fws"><message><to ><email>alice@foo.com</email></to ><from><email>bo
b@foo.com</email></from><msgbody><text>Sensitive content has been removed from this outgoing request as per our Company
policies</text></msgbody><subject>ssn</subject></message></m: SendMessage></SOAP-
ENV:Body></SOAP-ENV:Envelope>

In another embodiment, the request grammar rules can be extended to request field level redaction rules, where the replacement content can be specified on each request field. Using this extended grammar, web requests that are form field submissions (not file uploads or attachments) can undergo specific content redaction. The content matching engine 208 identifies the component that triggered a DLP violation. It also identifies data content match ranges in each component. Each violation match and the match range within a web request can be provided to the rule enforcement engine 210, which can then use the extended grammar rule to identify the request fields having a content match and the redaction rule to be applied on these matches. This field level redaction can be helpful, where the web server 120 performs some operation on the form submission parameters and creates a dynamic response. In these cases, replacement content can be expressed to match the data type and length of original request. It may be difficult to execute specific content match redaction rules for file uploads or attachments as the rules enforcement engine would need to have content extraction and re-composition capabilities for every possible file type. Listed below are some other exemplary rules that could be used by the rule enforcement engine 210:

mail.bar.com/*::REMOVE::SIMPLE:{body}
    www.foobar.com/blog/*::REMOVE::SIMPLE:{editArea;postArea}
    www.badsite.com::BLOCK::
    www.goodsite.com::ALLOW::

Alternatively, the rule enforcement engine 210 can use other rules for selective content removal of data content of the web request or for blocking the entire web request, as would be appreciated by one of ordinary skill in the art having the benefit of this disclosure.

Figure 3:
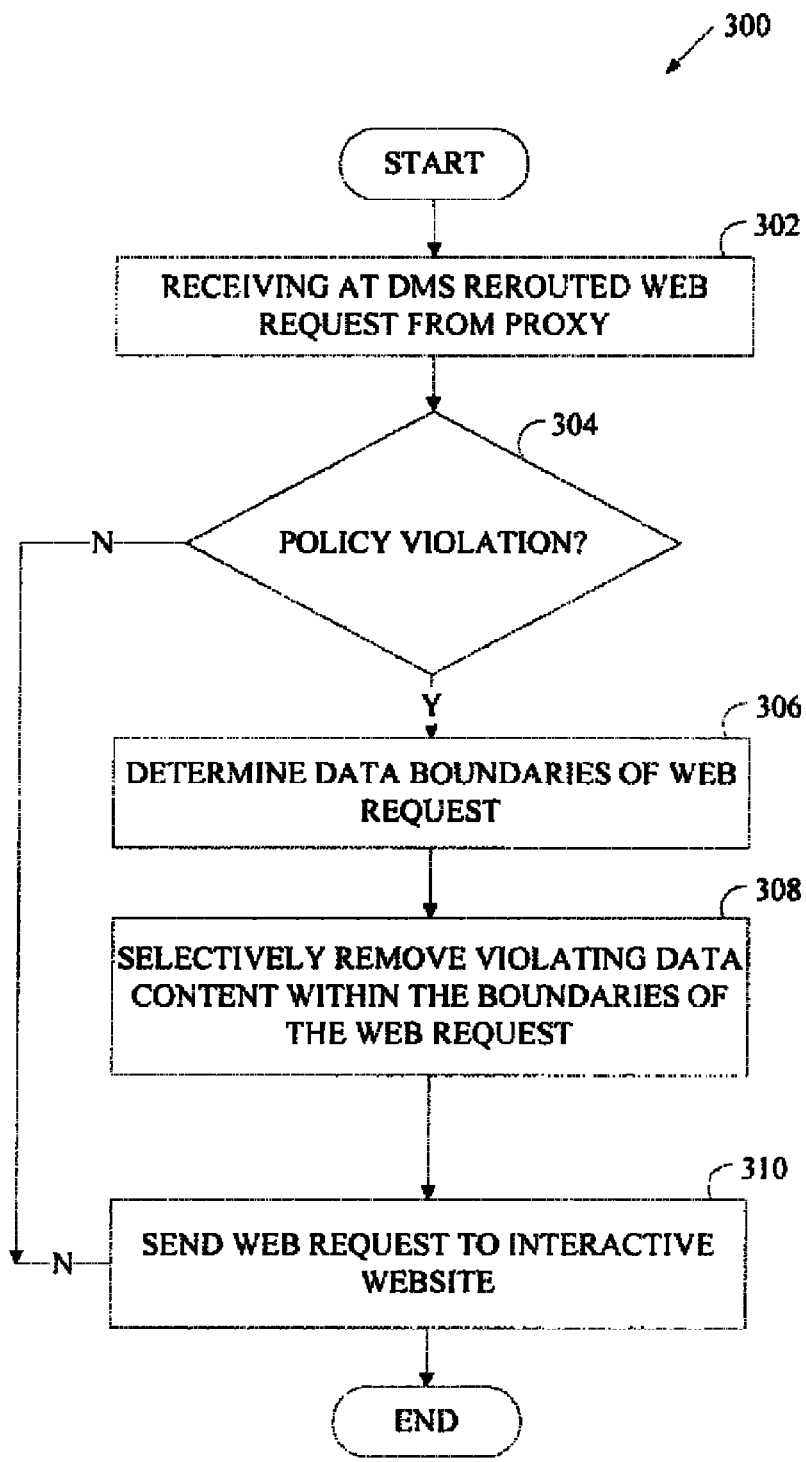
FIG. 3 is a flow diagram of one embodiment of a method of selectively removing data content within the boundaries of a web request.

FIG. 3 is a flow diagram of one embodiment of a method 300 of selectively removing data content within the boundaries of a web request. The method 300 is performed by processing logic that may comprise hardware (circuitry, dedicated logic, etc.), software (such as is run on a general purpose computer system or a dedicated machine), or a combination of both. In one embodiment, the method 300 is performed by a data monitoring component (e.g., DMS 108 of FIG. 1).

Referring to FIG. 3, processing logic begins with receiving a rerouted web request from the proxy (block 302), and evaluating the web request to determine whether the web request includes at least one data element that triggers a violation of a policy (block 304). Before block 304, processing logic may identify the policy for protecting source data having one or more data elements. The policy may specify the source data and include one or more rules (e.g., rules concerning data loss prevention) for triggering a violation, as well as policy parameters for excusing detected violations. The data elements may be in tabular or non-tabular format. If at block 304, the processing logic determines that the web request violates the policy, processing logic determines data boundaries of the web request (block 306), selectively removes data content within the data boundaries containing the at least one data element that triggered the violation (block 308), and sends the modified web request to the interactive website (block 310). By sending a modified web request without the selectively-removed data elements, the interactive website can process the modified web request as if it were the original web request containing the at least one data element that triggered the violation. If at block 304, the processing logic determines that the web request does not violate the policy, processing logic sends the web request unmodified to the interactive website (block 310). The determination at block 304 of whether the web request violates the policy can be made using a variety of search techniques, including search techniques discussed in more detail below in conjunction with FIGS. 6A-6C.

In another embodiment, before sending the modified web request, the processing logic may reevaluate the web request with the data elements selectively removed to validate that the data elements that triggered the violation have been successfully removed from the web request. The processing logic then sends the validated web request to the interactive website.

It should be noted that an email message sent using a conventional email client follows an internet message format standard for its composition and can be easily interpreted by mail servers, spam engines, DLP engines, etc. However, web requests sent to different webmail applications hosted by different websites do not conform to any standard in how the web requests are composed. Typically, all of these web requests use the same application-level protocol (e.g., HTTP), but differ in how the content of the webmail is encapsulated within the web requests and do not conform to any standard. Also, the encapsulation may change for a particular website depending on the technology used by the web servers. In order to modify the web requests and prevent data loss occurrence, the processing logic can determine a request grammar rule that captures the web request structure and aids in determining different data boundaries within a request. For example, the processing logic determines the request grammar rule for one of the interactive websites by evaluating a request URI of the web request, and matching the request URI to one of multiple predefined URI patterns. Each of the URI patterns corresponds to a predefined request grammar rule for the particular website. The processing logic uses the matched URI pattern to identify which request grammar rule is used for the interactive website, to which the web request is being sent.

Using the request grammar rule, the processing logic at block 306 can determine the data boundaries of the particular web request for selective content removal. As part of selectively removing the data content at block 308, the processing logic can redact the identified data boundaries to selectively remove the at least one data element from the web request. In one embodiment, the redacted portion of the web request is filled with replacement content, as expressed in the policy. In another embodiment, the processing logic removes an attachment including the data element that triggered the violation to redact the identified data boundaries. In another embodiment, the processing logic redacts the identified data boundaries by replacing an attachment including the data element that triggered the violation with a marker file containing replacement content, as expressed in the policy.

In addition to the operations illustrated and described with respect to FIG. 3, the processing logic may also perform other policy management and data monitoring operations associated with protecting the source data. In one embodiment, the processing logic can identify the source data to be protected and define one or more policies to protect the identified source data. The processing logic can also receive parameters pertaining to policies, such as pre-configured template policies or customized policies, for example, via the policy definition GUI 114, an API, or a configuration file, and create policies based on these parameters.

Figure 4:
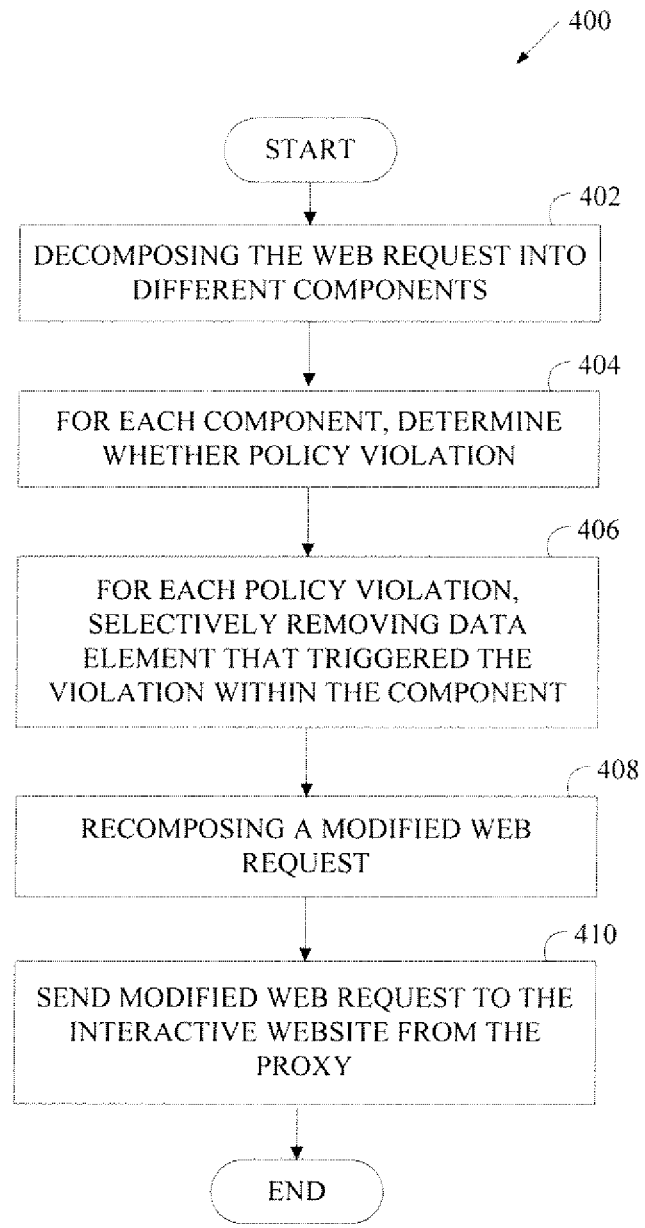
FIG. 4 is a flow diagram of one embodiment of a method of selectively removing data content within a web request intercepted by a proxy.

FIG. 4 is a flow diagram of one embodiment of a method 400 of selectively removing data content within a web request intercepted by a proxy. The method 400 is performed by processing logic that may comprise hardware (circuitry, dedicated logic, etc.), software (such as is run on a general purpose computer system or a dedicated machine), or a combination of both. In one embodiment, the method 400 is performed by a data monitoring component (e.g., DMS 108 of FIG. 1).

Referring to FIG. 4, processing logic of the data monitoring component decomposes the web request into different components (block 402). For each component, processing logic determines whether the particular component violates the policy (block 404) as described herein. Exemplary search techniques that can be used in this determination will be discussed in more detail below in conjunction with FIGS. 6A, 6B and 6C. At block 406, for each policy violation, processing logic selectively removes one or more data elements that triggered one or more policies within the component. Once the violating data elements have been selectively removed from each of the components, processing logic recomposes a modified web request using each of the components (block 408). At block 410, processing logic sends the modified web request to the interactive website by way of the proxy. By selectively removing the violating data elements and generating the modified web request, the interactive website is able to interpret the modified web request as if it were the original web request.

In one embodiment, the web request uses HTTP as an application-level protocol, and includes at least two components, a HTTP header and a HTTP body. The data content triggering a violation can be selectively removed from the HTTP request, as described below with respect to FIG. 5.

Figure 5:
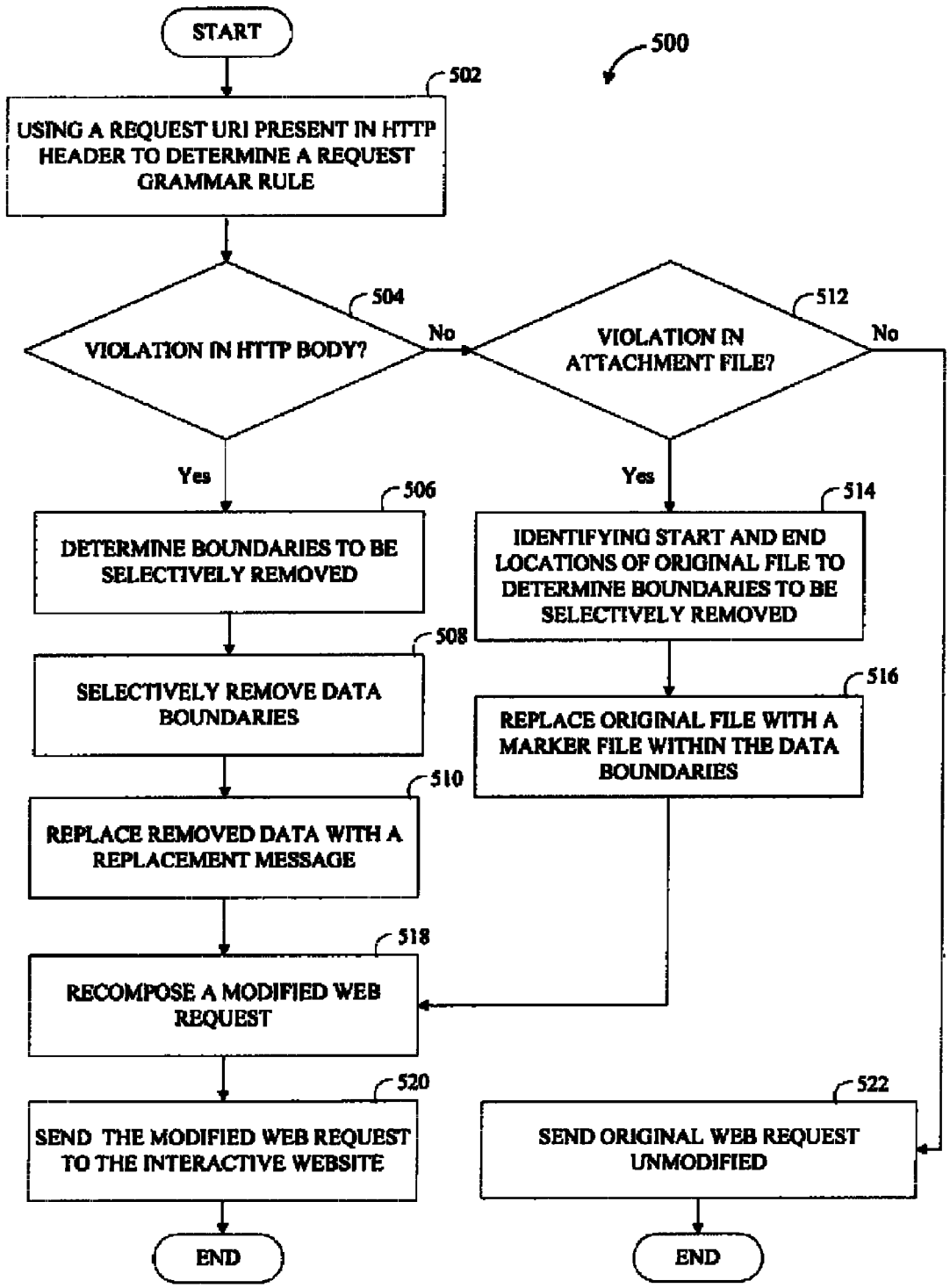
FIG. 5 is a flow diagram of one embodiment of a method of selectively removing data content within a HTTP web request intercepted by a proxy.

FIG. 5 is a flow diagram of one embodiment of a method of selectively removing data content within a HTTP web request intercepted by a proxy. The methods 500 is performed by processing logic that may comprise hardware (circuitry, dedicated logic, etc.), software (such as is run on a general purpose computer system or a dedicated machine), or a combination of both. In one embodiment, the method 500 is performed by a data monitoring component (e.g., DMS 108 of FIG. 1).

Referring to FIG. 5, processing logic begins with determining a request grammar rule using a request URI present in the HTTP header (block 502). At block 504, processing logic determines whether the violation is present in the HTTP body. For example, the processing logic may determine whether any tokens of the HTTP body contain data elements from the source data that trigger a violation of the policy. This determination can be made using a variety of search techniques, including search techniques discussed in more detail below in conjunction with FIGS. 6A-6C. If the violation is present in the HTTP body, processing logic determines which data boundaries need to be selectively removed using the request grammar rule (block 506), and selectively removes the data boundaries that need to be selectively removed (block 508). In one embodiment, the data element that triggered the violation can be replaced with a replacement message, as defined in the request grammar rule.

If at block 504, the processing logic determines that the violation is not present in the HTTP body, processing logic determines whether the violation is present in an attachment file that is part of the web request as a result of a file upload operation (block 512). If the violation is present in the attachment file, processing logic identifies file start and end locations of the attachment file to determine data boundaries to be selectively removed using the request grammar rule (block 514), and replaces the attachment file with a marker file within the data boundaries (block 516). At block 518, processing logic recomposes a modified web request that is similar in format to the original web request, but without the selectively-removed data elements, and/or with the marker file that replaced the removed attachment file. In one embodiment, the processing logic sets a request length of the modified web request to match the request length of the original web request. This allows the interactive website to interpret the modified web request as if it were the original web request. At block 520, processing logic sends the modified web request to the interactive website by way of the proxy. However, if the violation is not present in the HTTP body or the file upload operation in blocks 504 and 512, processing logic sends the original web request unmodified to the interactive websites (block 522) by way of the proxy. Accordingly, method 500 allows sensitive information to be protected from unauthorized use through web-based applications.

Figure 6A:
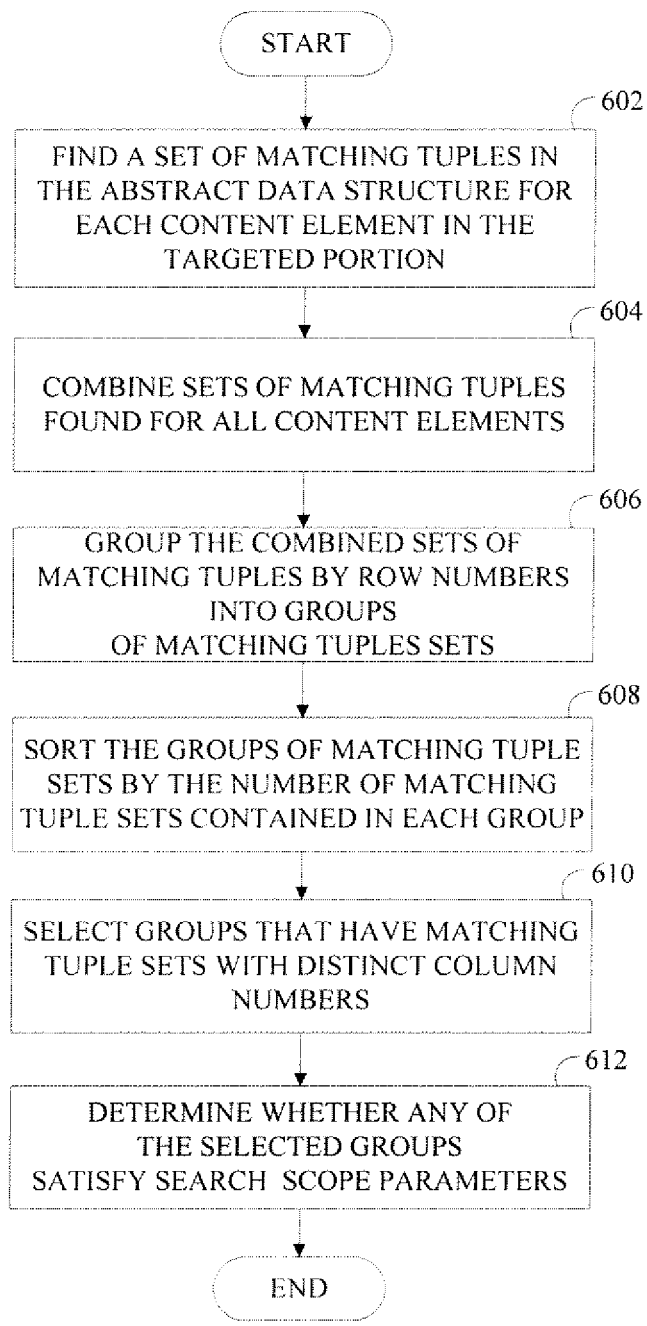
FIGS. 6A, 6B and 6C are flow diagrams of some embodiments of a method for finding a match for a subset of tokens in an abstract data structure derived from source data.
Figure 6B:
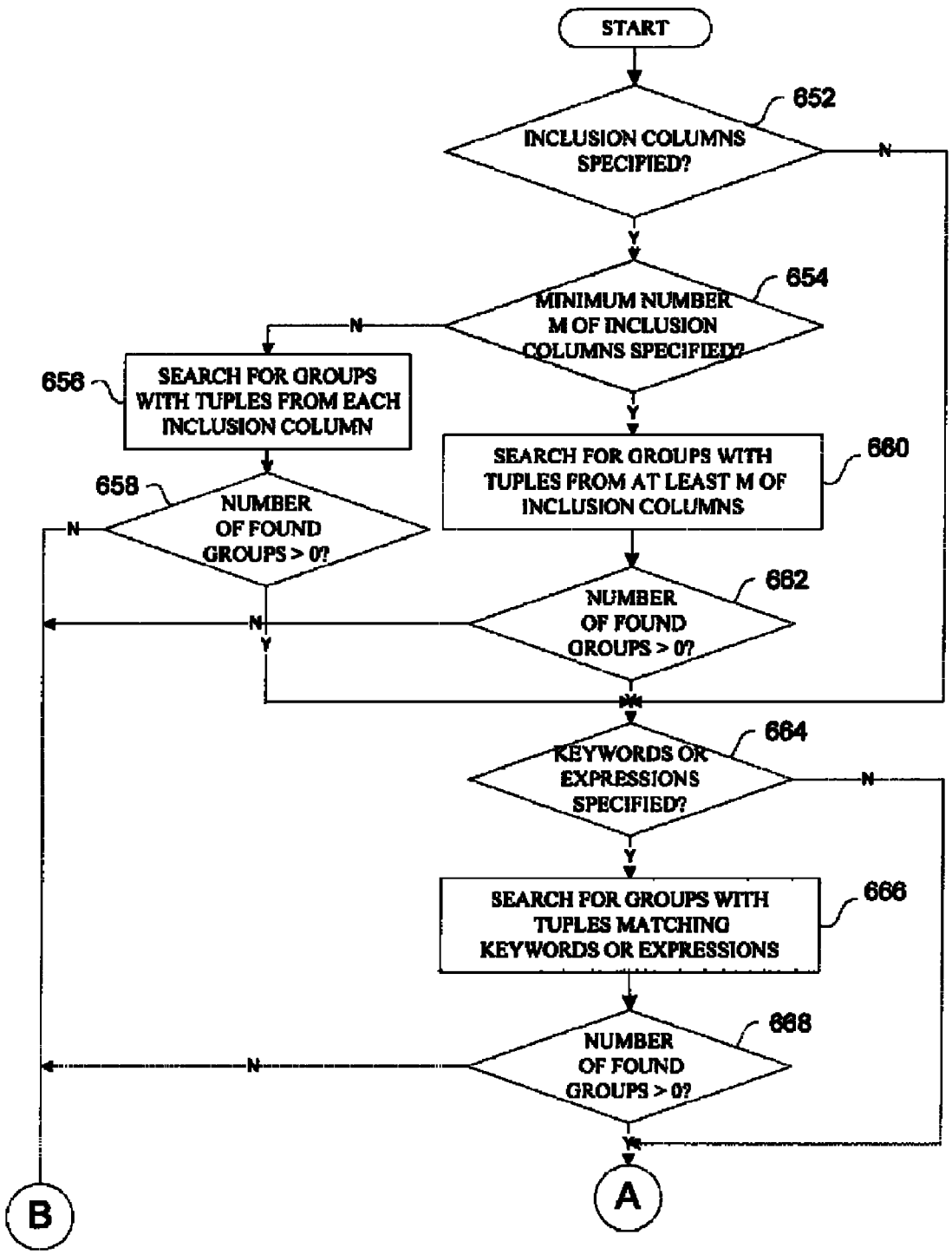
Figure 6B:
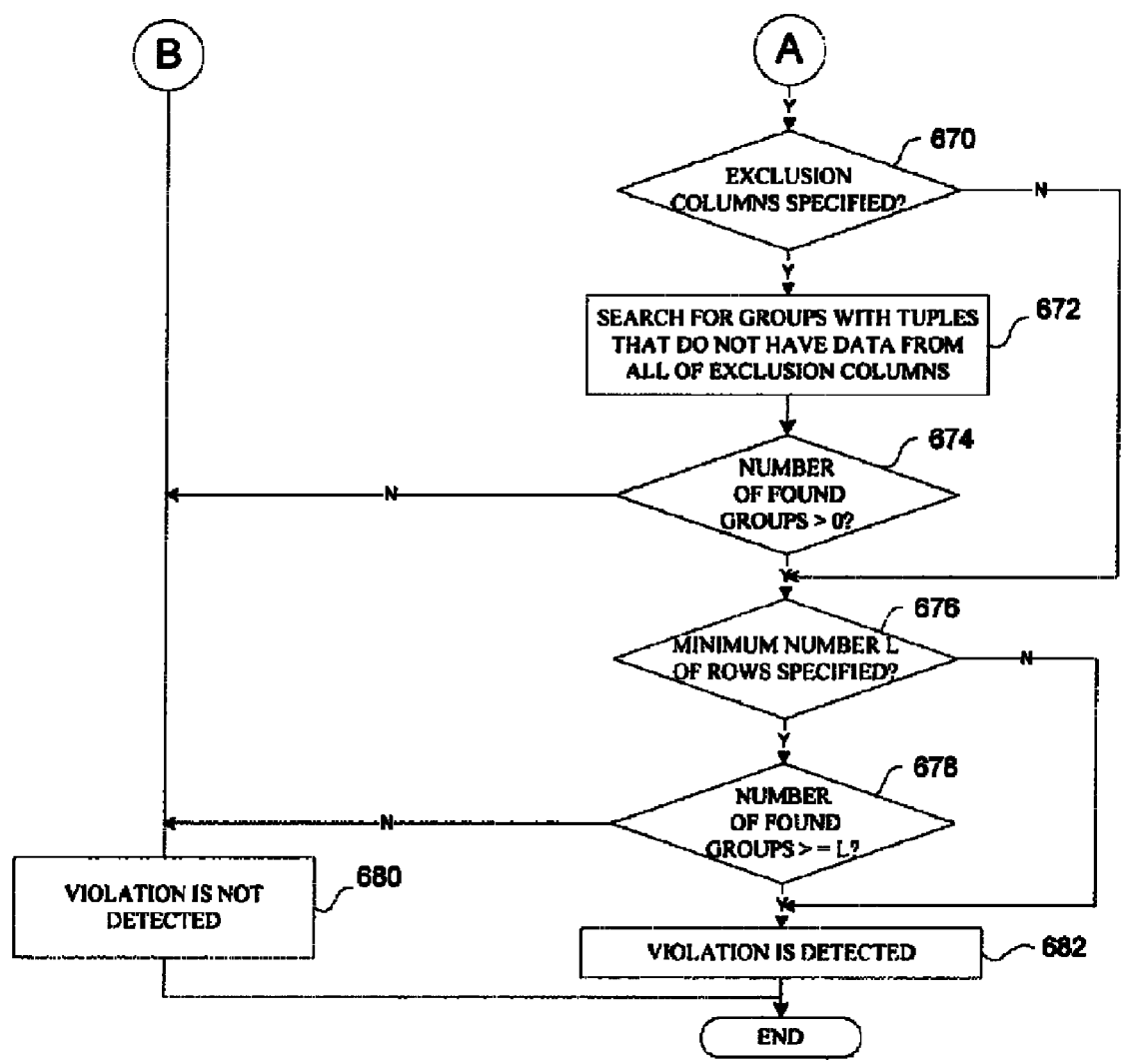
Figure 6C:
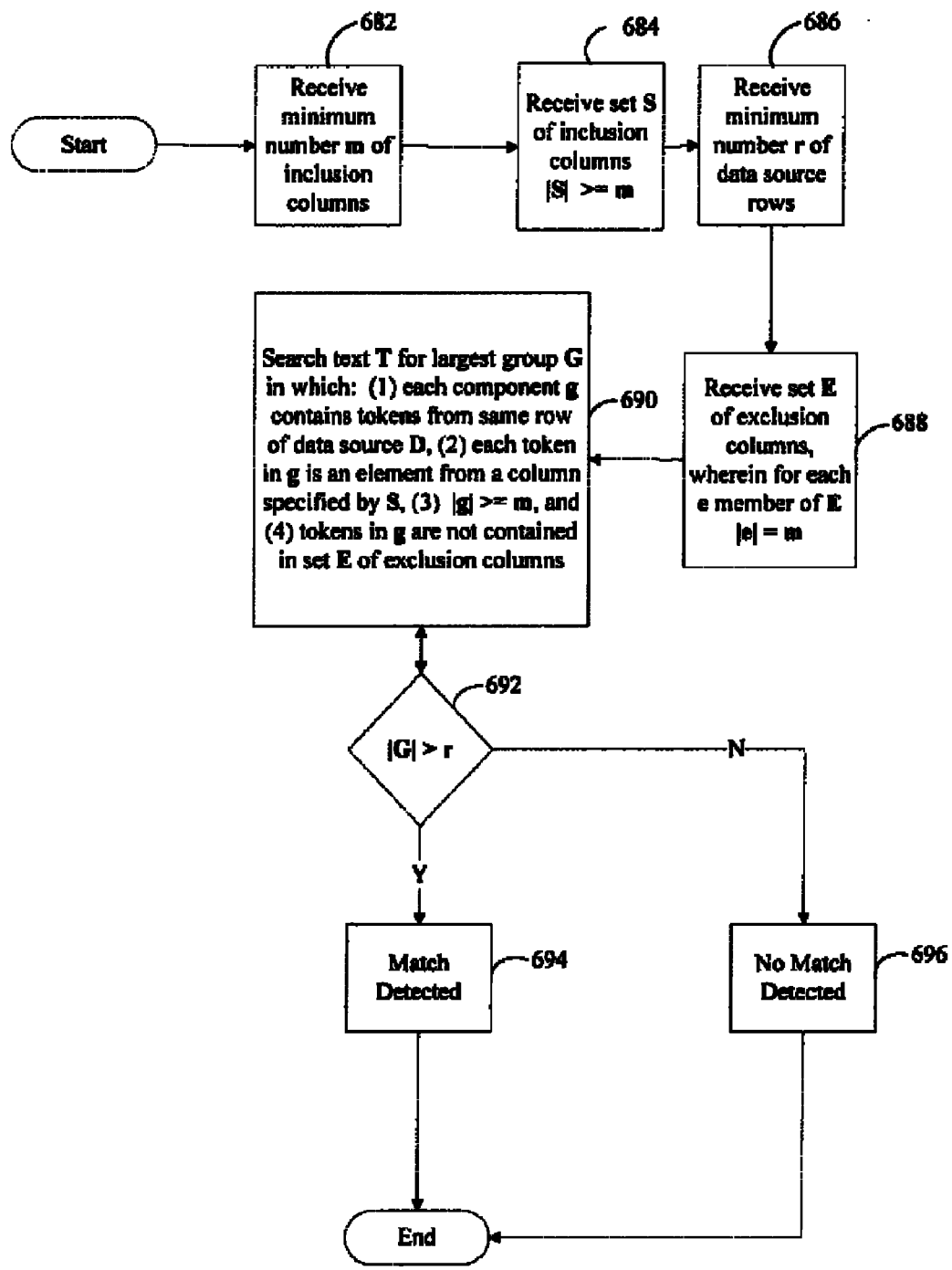

Exemplary search techniques will now be described in more detail. FIGS. 6A-6C are flow diagrams of various exemplary embodiments of a method to find in a subset of tokens a match satisfying policy parameters in an abstract data structure derived from source data in a tabular format. The method is performed by processing logic that may comprise hardware (circuitry, dedicated logic, etc.), software (such as is run on a general purpose computer system or a dedicated machine), or a combination of both. In one embodiment, the method is performed by a data monitoring component (e.g., DMS 108 of FIG. 1).

The abstract data structure used by this method may include the actual source data or a signature of the source data. The signature may include an encrypted or hashed copy of the source data element or some other representation of the source data element that would not allow a malicious user to recover the actual content of the source data element. In one embodiment, the abstract data structure also includes placement information, such as the number of a row and/or a column storing the data element in the source data. The data elements may be stored in a tuple-storage structure derived from the source data. A tuple-storage structure provides a mechanism for storing multiple tuples associated with the elements of the source data. Examples of tuple-storage structures include a hash table, a vector, an array, a tree or a list. Each type of the tuple-storage structure is associated with a method for retrieving a set of tuples for any given content element (the set of tuples may be empty if no match is found in the tuple-storage structure). The tuples may be in a predetermined order (e.g., in the ascending lexicographic order), and the contents of the abstract data structure may be treated cryptographically (e.g., with a hash function or using an encryption function with a cryptographic key) to further secure the abstract data structure from theft.

Referring to FIG. 6A, processing logic begins with searching, for each token or content fragment, the abstract data structure for a set of matching tuples (block 602). For example, a word "Smith" contained in the data content of the web request may have several occurrences in the source data that are reflected in the abstract data structure. Specifically, each of these occurrences has a corresponding tuple in the abstract data structure. During the search, processing logic retrieves a set of tuples corresponding to the occurrences of the word "Smith" in the source data. Each tuple stores information about the position of this data fragment within a database or a table storing the source data. In one embodiment, the positional information includes the row number of a cell storing the data fragment. In another embodiment, the positional information also includes a column number of this cell and optionally the data type of the column.

Next, processing logic combines the matching tuple sets found for all the content fragments (block 604) and then groups the combined matching tuple sets by row numbers into groups L (block 606). As a result, each group L (referred to herein as an accumulator) contains matching tuple sets that all have the same column number, i.e., the matching tuple sets in each group L correspond to fragments of the source data that all appear to be from the same column in the database.

Further, processing logic sorts the groups L by the number of matching tuple sets contained in each group (block 608) and, in one embodiment, selects those groups that have tuple sets with distinct column numbers (block 610). Afterwards, processing logic determines whether any of the selected groups satisfy policy parameters (block 612).

FIG. 6B illustrates one exemplary embodiment of a method for determining whether any selected groups of tuple sets satisfy policy parameters.

Referring to FIG. 6B, processing logic begins with determining whether the policy parameters specify inclusion columns (block 652). If not, processing logic proceeds to block 664. If so, processing logic determines whether the policy parameters specify a minimum number M of inclusion columns (block 654). If number M is specified, processing logic searches for groups with tuples from at least M number of the inclusion columns (block 660) and determines whether any such groups are found (i.e., the number of found groups is greater than 0) (block 662). If the determination made at block 662 is positive, processing logic proceeds to block 664. If the determination made at block 662 is negative, processing logic decides that no violation has been detected (block 680).

If number M is not specified (block 654), processing logic searches for groups with tuples from each specified inclusion column (block 656) and determines whether any such groups are found (block 658). If the determination made at block 658 is positive, processing logic proceeds to block 664. If the determination made at block 658 is negative, processing logic decides that no violation has been detected (block 680).

At block 664, processing logic determines whether the policy parameters specify any key words or expressions. If not, processing logic proceeds to block 670. If so, processing logic searches for groups with tuples matching the specified keywords or expressions (block 666) and determines whether any such groups are found (block 668). If the determination made at block 668 is positive, processing logic proceeds to block 670. If the determination made at block 668 is negative, processing logic decides that no violation has been detected (block 680).

At block 670, processing logic determines whether the policy parameters specify exclusion columns. If not, processing logic proceeds to block 676. If so, processing logic searches for groups with tuples that are not from all of the exclusion columns (block 672) and determines whether any such groups are found (block 674). If the determination made at block 672 is positive, processing logic proceeds to block 676. If the determination made at block 672 is negative, processing logic decides that no violation has been detected (block 680).

At block 676, processing logic determines whether the policy parameters specify a minimum number L of rows. If not, processing logic decides that a violation is detected (block 682). If so, processing logic determines whether the most recent number of found groups is not less than L (block 678). If this determination is positive, processing logic decides that a violation is detected (block 682). If the determination made at block 678 is negative, processing logic decides that no violation has been detected (block 680).

FIG. 6C illustrates an alternative exemplary embodiment of a method for determining whether any selected groups of tuple sets satisfy policy parameters.

Referring to FIG. 6C, processing logic begins with receiving parameter m that identifies the minimum number of inclusion columns (i.e., data source columns whose data needs to be included in the search result) (block 682).

Next, processing logic receives parameter S specifying the set of inclusion columns and confirms that ISI is greater or equal to m (block 684).

At block 686, processing logic receives parameter r specifying the minimum number of rows. Parameter r requires that the search result contain data from at least r rows of the source data.

At block 688, processing logic receives parameter E specifying a set of exclusion columns (i.e., data source columns whose data has to be excluded from the search result) and confirms that for each e member if E, |e| is equal to m.

At block 690, processing logic searches text T for the largest match group G in which:
(a) each components is a subset g of text T that contains tokens from the same row of data source D,
(b) each token from g is an element from a column in D specified by S,
(c) |g|>=m, and
(d) tokens of g do not contain data from exclusion columns E.

At block 692, processing logic determines whether |G| is greater than r. If so, processing logic decides that a match is detected (block 694). If not, processing logic decides that no match is detected (block 696).

Figure 7:
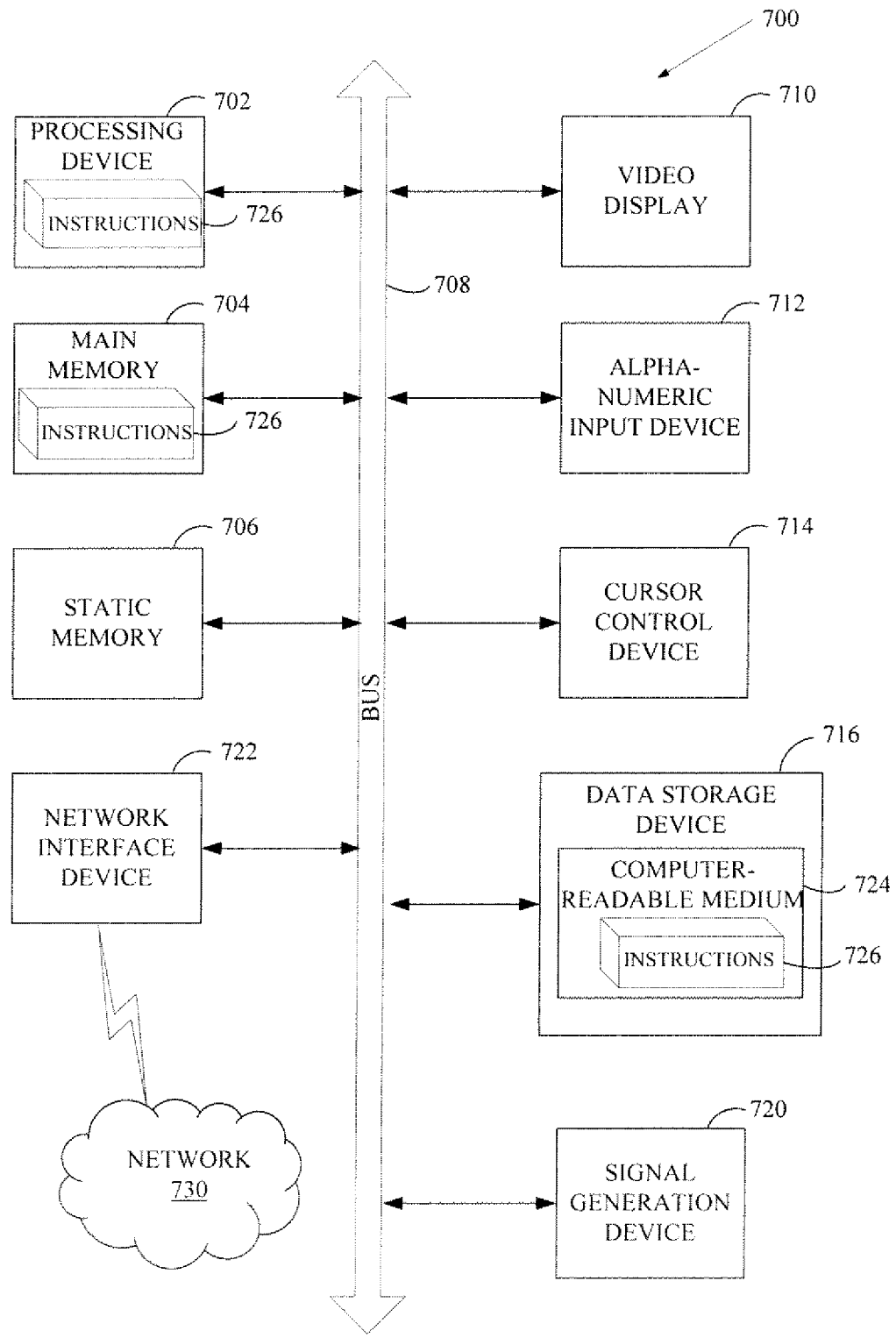
FIG. 7 illustrates a diagrammatic representation of a machine in the exemplary form of a computer system within which a set of instructions, for causing the machine to perform any one or more of the methodologies discussed herein, may be executed.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein, such as selective content removal of web requests to an interactive website.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored one or more sets of instructions (e.g., software 726) embodying any one or more of the methodologies or functions described herein. The software 726 may also reside, completely or at least partially, within the main memory 704 and/or within the processing device 702 during execution thereof by the computer system 700, the main memory 704 and the processing device 702 also constituting computer-readable storage media. The software 726 may further be transmitted or received over a network 730 via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine (e.g., computer) and that cause the machine to perform any one or more of the methodologies of the present invention. The term "computer-readable storage medium" shall accordingly be taken to include, but not be limited to, solid-state memories, optical media, and magnetic media.

The embodiments described herein may be used to ensure seamless interaction with interactive web applications, while provisioning DLP using selective content removal. The embodiments described herein may help eliminate poor user experiences that can occur when web request from these interactive web applications are blocked entirely. The embodiments described herein may be used to help users from experiencing unstable application, or application crashes. The embodiments described herein can be used to enable DLP in network environments without interrupting employee productivity, increasing helpdesk support calls or request, or the like.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A computer-implemented method, comprising:
    identifying a policy for protecting source data, having a plurality of data elements, using a data monitoring system (DMS) including a processor, the policy maintained by an organization to prevent loss of sensitive information;
    evaluating, at the DMS, a web request sent to an interactive website as part of a web-based application, wherein the interactive website hosts the web-based application, wherein the web request is encapsulated according to a data structure specified by the interactive website;
    determining by the DMS, that the web request includes at least one of the plurality of data elements triggering a violation of the policy;
    determining data boundaries of the web request upon receiving the web request at the DMS, wherein determining the data boundaries of the web request comprises determining a rule used to capture the specified data structure of the web request sent to the interactive website, and wherein the specified data structure specifies the data boundaries of the web request;
    selectively removing data content within the data boundaries containing the at least one data element that triggered the violation to allow the web request to be processed by the interactive website as if it were the original web request containing the at least one data element, wherein selectively removing the data content within the data boundaries comprises replacing the data content with replacement content based on a data type and length of the web request;
    reevaluating, at the DMS, the web request with the at least one data element selectively removed to determine whether the data elements that triggered the violation have been successfully removed from the web request, wherein the web request with the at least one data element selectively removed comprises a header indicating that the web request with the at least one data element selectively removed is a resubmission for content validation;
    upon determining that the data elements that triggered the violation have been successfully removed from the web request, sending the web request to the interactive website, wherein the header is removed from the web request; and
    upon determining that the data elements that triggered the violation have not been successfully removed from the web request, blocking the web request or allowing the web request to be sent to the interactive website unmodified.

2. The method of claim 1, wherein the web request uses Hypertext Transfer Protocol (HTTP) as an application-level protocol, and wherein the rule is a request grammar rule.

3. The method of claim 1, wherein selectively removing the data content within the data boundaries further comprises:
    identifying the data boundaries of the web request containing the at least one data element that triggered the violation; and
    redacting the identified data boundaries to selectively remove the at least one data element from the web request.

4. The method of claim 3, wherein selectively removing the data content within the data boundaries further comprises filling the identified data boundaries of the web request with the replacement content.

5. The method of claim 3, wherein redacting the identified data boundaries comprises replacing an attachment file including the at least one data element that triggered the violation with a marker file containing replacement content.

6. The method of claim 1, wherein determining the rule comprises matching a request Uniform Resource Identifier (URI) of the web request to one of a plurality of URI patterns, each corresponding to a predefined request grammar rule, wherein the predefined request grammar rule that corresponds to the matched URI pattern is the rule used for the interactive website.

7. The method of claim 6, wherein the predefined request grammar rule is determined by,
    monitoring a plurality of web requests previously sent to the interactive website;
    analyzing syntax of the plurality of web requests to define the predefined request grammar rule used for the interactive website; and
    providing a URI pattern for the interactive website as one of the plurality of URI patterns to correspond to the predefined request grammar rule used for the interactive website.

8. The method of claim 1, further comprising sending the web request with the at least one data element selectively removed to the interactive website.

9. The method of claim 1, wherein determining the rule comprises defining the rule using an expression language, wherein the rule comprises a Uniform Resource Identifier (URI) pattern to match a URI request contained in the web request, and an action to be performed in response to detecting the violation in the web request.

10. The method of claim 9, wherein the expression language is Backus-Naur Form (BNF) based expression language.

11. The method of claim 9, wherein the rule further comprises an action message to be inserted into the web request for the at least one data element that triggered the violation, and a field type and description that is used to identify a field of the web request that is likely to contain the at least one data element.

12. The method of claim 1, comprising:
intercepting by a proxy the web request sent to the interactive website from a web browser;
sending the web request to the DMS from the proxy;
decomposing the web request at the DMS into a plurality of different components;
for each of the plurality of different components, determining by the DMS that data content of the particular component includes a data element that triggers a violation of the policy;
for each violation, selectively removing the data content within the particular component containing the data element that triggered the violation;
recomposing a modified web request using each of the plurality of different components without the selectively-removed data content to enable the interactive website to interpret the modified web request as if it were the original web request; and
sending the modified web request to the interactive website from the proxy.

13. The method of claim 12, wherein the web request uses Hypertext Transfer Protocol (HTTP) as an application-level protocol, and comprises a HTTP header and a HTTP body, and wherein selectively removing the data content comprises:
determining a request grammar rule using a request Uniform Resource Identifier (URI) present in the HTTP header;
determining whether the violation is present in the HTTP body;
if the violation is present in the HTTP body, determining which data boundaries need to be selectively removed using the request grammar rule; and
selectively removing the data boundaries that need to be selectively removed.

14. The method of claim 13, wherein selectively removing comprises:
removing the data element that triggered the violation; and
replacing the removed data element with a replacement message as defined in the request grammar rule.

15. The method of claim 13, further comprising:
determining whether the violation is present in an attachment file that is part of the web request resulting from a file upload operation;
if the violation is present in the attachment file, identifying file start and end locations of the attachment file to determine data boundaries to be selectively removed using the request grammar rule; and
replacing the attachment file with a marker file within the data boundaries.

16. The method of claim 12, wherein recomposing the modified web request comprises setting a request length of the modified web request to match the request length of the original web request.

17. An apparatus comprising:
a network interface device to receive a web request sent to an interactive website as part of a web-based application, the web-based application being hosted from the interactive website, wherein the web request is encapsulated according to a data structure specified by the interactive website; and
a processing device coupled to the network interface device, the processing device to identify a policy for protecting source data having a plurality of data elements, the policy maintained by an organization to prevent loss of sensitive information, to evaluate the web request to determine that the web request includes at least one of the plurality of data elements triggering a violation of the policy, to determine data boundaries of the web request upon receiving the web request at the processing device, wherein to determine the data boundaries of the web request comprises determining a rule used to capture the specified data structure of the web request sent to the interactive website, wherein the specified data structure specifies the data boundaries of the web request, to selectively remove data content within the data boundaries containing the at least one data element that triggered the violation, to send a modified web request to a proxy without the selectively removed data content, wherein to selectively remove the data content within the data boundaries comprises replacing the data content with replacement content based on a data type and length of the web request, to reevaluate the web request without the selectively removed data content to determine whether the data elements that triggered the violation have been successfully removed from the web request, wherein the web request without the selectively removed data content comprises a header indicating that the web request with the selectively removed data content is a resubmission for content validation, to send the web request to the interactive website upon determining that the data elements that triggered the violation have been successfully removed from the web request, wherein the header is removed from the web request, and to block the web request or allow the web request to be sent to the interactive website unmodified upon determining that the data elements that triggered the violation have not been successfully removed from the web request.

18. The apparatus of claim 17, wherein the processing device comprises:
a content matching engine to evaluate the web request to determine that the web request includes the at least one of the plurality of data elements triggering the violation of the policy; and
a rule enforcement engine coupled to the content matching engine, the rule enforcement engine to determine data boundaries of the original web request, to selectively remove the data elements triggering the plurality of violations within the determined data boundaries, and to generate the modified web request without the selectively removed data content.

19. A non-transitory computer-readable storage medium having instructions stored thereon that when executed by a computer cause the computer to perform operations comprising:
identifying a policy for protecting source data, having a plurality of data elements, using a data monitoring system (DMS), the policy maintained by an organization to prevent loss of sensitive information;
evaluating, at the DMS, a web request sent to an interactive website as part of a web-based application, wherein the interactive website hosts the web-based application, wherein the web request is encapsulated according to a data structure specified by the interactive website;

determining by the DMS that the web request includes at least one of the plurality of data elements triggering a violation of the policy, wherein determining the data boundaries of the web request comprises determining a rule used to capture the specified data structure of the web request sent to the interactive website, and wherein the specified data structure specifies the data boundaries of the web request;

determining data boundaries of the web request upon receiving the web request at the DMS;

selectively removing data content within the data boundaries containing the at least one data element that triggered the violation to allow the web request to be processed by the interactive website as if it were the original web request containing the at least one data element, wherein selectively removing the data content within the data boundaries comprises replacing the data content with replacement content based on a data type and length of the web request;

reevaluating, at the DMS, the web request with the at least one data element selectively removed to determine whether the data elements that triggered the violation have been successfully removed from the web request, wherein the web request with the at least one data element selectively removed comprises a header indicating that the web request with the at least one data element selectively removed is a resubmission for content validation;

upon determining that the data elements that triggered the violation have been successfully removed from the web request, sending the web request to the interactive website, wherein the header is removed from the web request; and upon determining that the data elements that triggered the violation have not been successfully removed from the web request, blocking the web request or allowing the web request to be sent to the interactive website unmodified.

* * * * *